United States Patent
Ossonon et al.

(10) Patent No.: US 11,735,719 B2
(45) Date of Patent: Aug. 22, 2023

(54) REDUCED GRAPHENE OXIDE/MANGANESE(IV) OXIDE NANOCOMPOSITE AND ELECTRODE COMPRISING SAME, METHOD OF MANUFACTURE OF VARIOUS GRAPHENE MATERIAL/METAL OXIDE NANOCOMPOSITES

(71) Applicant: INSTITUT NATIONAL DE LA RECHERCHE SCIENTIFIQUE, Montreal (CA)

(72) Inventors: Benjamin Diby Ossonon, Montreal (CA); Ana Berta Lopes Correia Tavares, Verdun (CA)

(73) Assignee: INSTITUT NATIONAL DE LA RECHERCHE SCIENTIFIQUE, Quebec (CA)

(*) Notice: Subject to any disclaimer, the term of this patent is extended or adjusted under 35 U.S.C. 154(b) by 282 days.

(21) Appl. No.: 17/095,231

(22) Filed: Nov. 11, 2020

(65) Prior Publication Data

US 2021/0159490 A1 May 27, 2021

Related U.S. Application Data

(60) Provisional application No. 62/939,721, filed on Nov. 25, 2019.

(51) Int. Cl.
*H01M 4/36* (2006.01)
*H01M 4/50* (2010.01)
(Continued)

(52) U.S. Cl.
CPC ............ *H01M 4/364* (2013.01); *H01G 9/042* (2013.01); *H01M 4/502* (2013.01); *H01M 4/587* (2013.01);
(Continued)

(58) Field of Classification Search
None
See application file for complete search history.

(56) References Cited

U.S. PATENT DOCUMENTS

| 9,070,942 B2 | 6/2015 | Liu et al. |
| 2013/0001089 A1 | 1/2013 | Li et al. |
| | (Continued) | |

FOREIGN PATENT DOCUMENTS

| CN | 102013477 A | 4/2011 |
| CN | 10729310 A | 10/2017 |
| | (Continued) | |

OTHER PUBLICATIONS

AbdelHamid et al., Generalized Synthesis of Metal Oxide Nanosheets and Their Application as Li-Ion Battery Anodes, Adv. Mater 29, 1701427 (2017).
(Continued)

*Primary Examiner* — Wyatt P McConnell
(74) *Attorney, Agent, or Firm* — Lavery, De Billy, LLP; Isabelle Pelletier

(57) ABSTRACT

A reduced graphene oxide/manganese(IV) oxide nanocomposite is provided. This nanocomposite comprises reduced graphene oxide flakes and manganese oxide nanoparticles distributed on the surface of the flakes. Electrodes comprising this nanocomposite are also provided. Embodiments of such electrodes displayed broad voltage windows. A method for producing the nanocomposites as well as other nanocomposites is also provided. The method comprises the step of electrochemically exfoliating graphite in an exfoliation electrolyte comprising an intercalant and a precursor which is an oxometallate, a polyoxometalate, a thiometallate, or metal salt together with an acid.

20 Claims, 18 Drawing Sheets

(51) Int. Cl.
  H01M 10/0525    (2010.01)
  H01G 9/042      (2006.01)
  H01M 4/587      (2010.01)
  H01M 4/02       (2006.01)
(52) U.S. Cl.
  CPC .. *H01M 10/0525* (2013.01); *H01M 2004/021* (2013.01)

(56) References Cited

U.S. PATENT DOCUMENTS

| | | |
|---|---|---|
| 2013/0102084 A1 | 4/2013 | Loh et al. |
| 2014/0166475 A1 | 6/2014 | Cheng et al. |
| 2015/0166348 A1 | 6/2015 | Ikenuma et al. |
| 2016/0017502 A1 | 1/2016 | Santhanam et al. |

FOREIGN PATENT DOCUMENTS

| | | |
|---|---|---|
| CN | 108905910 A | 11/2018 |
| EP | 3403994 A1 | 11/2018 |
| WO | 2011141486 A1 | 11/2011 |
| WO | 2013132261 A1 | 9/2013 |
| WO | 2014004514 A1 | 1/2014 |
| WO | 2017060434 A1 | 4/2017 |

OTHER PUBLICATIONS

Abdelkader et al., How to get between the sheets: a review of recent works on the electrochemical exfoliation of graphene materials from bulk graphite, Nanoscale, 2015, 7, 6944.
Achee et al. High-yield scalable graphene nanosheet production from compressed graphite using electrochemical exfoliation, Scientific Reports (2018) 8:14525.
Ambrosi et al., Electrochemically Exfoliated Graphene and Graphene Oxide for Energy Storage and Electrochemistry applications, Chem. Eur. J. 2016, 22, 153-159.
Bakandritsos et al., Covalently functionalized graphene as a supercapacitor electrode material, FlatChem. 13, 25-33 (2019).
Carneiro et al., Nb2O5 nanoparticles supported on reduced graphene oxide sheets as electrocatalyst for the H2O2 electrogeneration, J. Catal. 332 51-61 (2015).
Chen et al., An improved Hummers method for eco-friendly synthesis of graphene oxide, Carbon, 64, 2013, 225-229.
Drieschner et al., Uniformly coated highly porous graphene/MnO2foams for flexible asymmetric supercapacitors, Nanotechnology, 2018, 29, 225402.
Ejigu et al., Electrochemically Exfoliated Graphene Electrode for High-Performance Rechargeable Chloroaluminate and Dual-Ion Batteries, ACS Appl. Mater. Interfaces 2019, 11, 23261-23270.
Ejigu et al., On the Role of Transition Metal Salts During Electrochemical Exfoliation of Graphite: Antioxidants or Metal Oxide Decorators for Energy Storage Applications, Adv. Funct. Mater. 28, 1804357 (2018).
Fu et al., Evaluation and Characterization of Reduced Graphene Oxide Nanosheets as Anode Materials for Lithium-Ion Batteries, Int. J. Electrochem. Sci. 8, 6269-6280 (2013).
Gambou-Bosca et al., Chemical Mapping and Electrochemical Performance of Manganese Dioxide/Activated Carbon Based Composite Electrode for Asymmetric Electrochemical Capacitor, J. Electrochem. Soc. 162, A5115-A5123 (2015).
Gao et al., Microstructures and Spectroscopic Properties of Cryptomelane-type Manganese Dioxide Nanofibers, J. Phys. Chem. 112, 13134-13140 (2008).
Greenwood et al., Covalent Modification of Graphene and Graphite Using Diazonium Chemistry: Tunable Grafting and, ACS Nano. 9, 5520-5535 (2015).
Junfei et al., One-Step In situ Synthesis of SnO2/Graphene Nanocomposites and Its Application as an Anode Material for Li-Ion Batteries, ACS Appl. Mater. Interfaces 4, 454-459 (2012).
Kwon et al., Mass-Produced Electrochemically Exfoliated Graphene for Ultrahigh Thermally Conductive Paper Using a Multimetal Electrode System, Adv. Mater. Interfaces 2019, 6, 9, 1900095.
Lee et al., Improved supercapacitor performance of MnO2-graphene composites constructed using a supercritical fluid and wrapped with an ionic liquid, J. Mater. Chem. A, 2013, 1, 3395-3405.
Li et al., Flexible graphene/MnO2 composite papers for supercapacitor electrodes, J. Mater. Chem. 21, 14706-14711 (2011).
Li et al., Synthesis of hydrothermally reduced graphene/MnO2 composites and their electrochemical properties as supercapacitors, J. Power Sources. 196, 8160-8165 (2011).
Moon et al., Reduced graphene oxide by chemical graphitization, Nat. Commun. 1, 73-79 (2010).
Mujeeb et al., Graphene based metal and metal oxide nanocomposites: synthesis, properties and their applications, J. Mater. Chem. A, 3, 18753-18808 (2015).
Muralikrishna et al., In situ reduction and functionalization of graphene oxide with l-cysteine for simultaneous electrochemical determination of cadmium(ii), lead(ii), copper(ii), and mercury(ii) ions, Anal. Methods, 2014,6, 8698-8705.
Novoselov et al., Electric field effect in atomically thin carbon films., Science. 306, 666-669 (2004).
Ossonon et al., Functionalization of graphene sheets by the diazonium chemistry during electrochemical exfoliation of graphite, Carbon 111, 83-93 (2017).
Parvez et al., Electrochemically Exfoliated Graphene as Solution-Processable, Highly Conductive Electrodes for Organic Electronics, ACS Nano 2013, 7, 4, 3598-3606.
Supplementary Information for Parvez et al., Electrochemically Exfoliated Graphene as Solution-Processable, Highly Conductive Electrodes for Organic Electronics, ACS Nano 2013, 7, 4, 3598-3606.
Parvez et al., Exfoliation of Graphite into Graphene in Aqueous Solutions of Inorganic Salts, J. Am. Chem. Soc. 2014, 136, 6083-6091.
Tripathi et al., Synthesis of High-Quality Graphene through Electrochemical Exfoliation of Graphite in Alkaline Electrolyte, arXiv:1310.7371.
Salanne et al., Efficient storage mechanisms for building better supercapacitors, Nat. Energy. 1, 16070-16080 (2016).
Sutter et al., Epitaxial Graphene on Ruthenium. Nat. Mater. 7, 406-411 (2008).
Xu et al., High-performance MnO2-deposited graphene/activated carbon film electrodes for flexible solid-state supercapacitor, Scientific Reports, 2017, 7, article No. 12857.
Yang et al., Facile Fabrication of Functionalized Graphene Sheets (FGS)/ZnO Nanocomposites with Photocatalytic Property, ACS Appl. Mater. Interfaces. 3, 2779-2785 (2011).
Yang et al., Graphene/MnO2 composite prepared by a simple method for high performance supercapacitor, Mater. Res. Innov. 20, 92-98 (2016).
Yu et al., Enhancing the Supercapacitor Performance of Graphene/MnO2 Nanostructured Electrodes by Conductive Wrapping, Nano Lett., 11, 4438-4442 (2011).
Zhang et al., One-step electrochemical preparation of graphene-based heterostructures for Li storage, J. Mater. Chem., 2012, 22, 8455-8461.
Supplementary Information on Zhang et al., One-step electrochemical preparation of graphene-based heterostructures for Li storage, J. Mater. Chem., 2012, 22, 8455-8461.
Zhang et al., How graphene is exfoliated from graphitic materials: synergistic effect of oxidation and intercalation processes in open, semi-closed, and closed carbon, J. Mater. Chem., 22, 22150-22154 (2012).
Zhong et al., Preparation of 3D Reduced Graphene Oxide/MnO2 Nanocomposites through a Vacuum-Impregnation Method and Their Electrochemical Capacitive Behavior, ChemElectroChem. 4, 1088-1094 (2017).
Zhu et al., One-step electrochemical approach to the synthesis of Graphene/MnO2 nanowall hybrids, Nano Res. 4, 648-657 (2011).

REDUCED GRAPHENE OXIDE/MANGANESE(IV) OXIDE NANOCOMPOSITE AND ELECTRODE COMPRISING SAME, METHOD OF MANUFACTURE OF VARIOUS GRAPHENE MATERIAL/METAL OXIDE NANOCOMPOSITES

CROSS REFERENCE TO RELATED APPLICATIONS

This application claims benefit, under 35 U.S.C. § 119(e), of U.S. provisional application Ser. No. 62/939,721, filed on Nov. 25, 2019. All documents above are incorporated herein in their entirety by reference.

FIELD OF THE INVENTION

The present invention relates to a reduced graphene oxide/manganese(IV) oxide nanocomposite as well as methods to produce this and other graphene material/metal compound nanocomposites. More specifically, the present invention is concerned with a reduced graphene oxide/manganese (IV) oxide nanocomposite and its use in electrodes, advantageous providing electrodes with broad voltage windows.

BACKGROUND OF THE INVENTION

Among 2D materials, graphene—a two-dimensional honeycomb $sp^2$ carbon lattice—is by far the most attractive one due to its unique electronic, chemical and mechanical properties. It has been used in its pristine form and in reinforced composite materials for a large number of applications covering electrical and energy storage devices and sensors. However, the large-scale production of high quality and solution processable graphene via simple low-cost methods remains a major challenge. Several methods have been developed to produce graphene. Among them, mechanical exfoliation and epitaxial growth of graphene lead to a material with high quality, which exhibits excellent electron mobility, high thermal conductivity and the ability to sustain extremely high densities of electric current to only cite a few, but produce only a single layer material and therefore they are mainly used for fundamental research.

Recently, electrochemical exfoliation of graphite has attracted attention as a simple and efficient way to produce graphene. The prior art describes the preparation of graphene type material by electrochemical exfoliation using a carbon-based electrode and an aqueous electrolyte which may contain an acid such as $H_2SO_4$.

Graphene can be used in different fields such as biosensors, organic field-effect transistors, inks, electrocatalysts, and batteries by functionalizing it with different molecules and/or particles as described. However, its production generally requires multiple steps and the use of a long list of chemicals. Known process for the synthesis of metal oxides encapsulated in graphene flakes generally comprise many steps. For example, a method based on hydrothermal synthesis to prepare a reduced graphene/$MnO_2$ composite, with graphene oxide, which is previously synthesized by modified Hummers' method, has been described.

Processes have also been used to prepare graphene-based composites for Li-ion batteries applications. In general, most of methods developed for the synthesis of graphene metal and/or metal oxides involve many steps, sometimes with a need for reducing agents, surfactant and with an increase in temperature during the reaction. The common point of all approaches is typically as follow: a) providing graphene in a first suspension, b) adding a metal oxide precursor to the dispersed graphene to form a second suspension, and then c) precipitating the metal oxide on the surface of the dispersed graphene with an increase of the temperature and the reaction time.

SUMMARY OF THE INVENTION

In accordance with the present invention, there is provided:
1. A reduced graphene oxide/manganese(IV) oxide nanocomposite comprising reduced graphene oxide flakes and manganese oxide nanoparticles distributed on the surface of the flakes.
2. The nanocomposite of item 1, consisting of the reduced graphene oxide flakes and the manganese(IV) oxide nanoparticles.
3. The nanocomposite of item 1 or 2, wherein the reduced graphene oxide flakes range from about 1 μm to about 15 μm, preferably from about 1 μm to about 10 μm, and more preferably from about 3 μm to about 10 μm in lateral size.
4. The nanocomposite of any one of items 1 to 3, wherein the reduced graphene oxide flakes are few-layer flakes of the graphene material.
5. The nanocomposite of any one of items 1 to 4, wherein the reduced graphene oxide flakes may comprise between 1 and 9 layers, preferably between 1 and 8 layers, more preferably between 1 and 5 layers.
6. The nanocomposite of any one of items 1 to 5, wherein the manganese oxide nanoparticles are rod-shaped.
7. The nanocomposite of item 6, wherein the rod-shaped nanoparticles are about 100 nm to about 300 nm, preferably about 150 nm to about 250 nm, and more preferably about 200 nm in average length.
8. The nanocomposite of item 6 or 7, wherein the rod-shaped nanoparticles are about 20 nm to about 50 nm, preferably about 30 nm to about 40 nm, and more preferably about 35 nm in average width.
9. The nanocomposite of any one of items 1 to 8, wherein some of the nanoparticles form aggregates, preferably up to 1 μm in size.
10. The nanocomposite of any one of items 1 to 9, wherein the $MnO_2$ loading in the nanocomposite is about 30 wt % to about 50 wt %, preferably about 35 wt % to about 45 wt %, and more preferably about 40 wt %, based on the total weight of the nanocomposite.
11. The nanocomposite of any one of items 1 to 10, wherein the only elements present in the nanocomposite, e.g. as detected by an energy dispersive X-ray detector (EDX) on a SEM microscope and/or by energy-dispersive X-ray spectroscopy (EDS), are carbon, oxygen, and manganese.
12. The nanocomposite of any one of items 1 to 11, wherein the nanocomposite is characterized by an energy-dispersive X-ray spectrum as shown in FIG. 12.
13. The nanocomposite of any one of items 1 to 12, wherein the nanocomposite is characterized by an X-ray diffraction pattern comprising 20 peaks at about 12.30°, about 24.06°, about 33.06°, and about 37.56°; preferably by peaks at about 12.30°, about 24.06°, about 33.06°, about 37.56°, about 43.3°, and about 49.1°.
14. The nanocomposite of any one of items 1 to 13, wherein the nanocomposite is characterized by an X-ray diffraction pattern as shown in FIG. 8, top curve.
15. The nanocomposite of any one of items 1 to 14, wherein the nanocomposite is characterized by a Raman spectrum comprising peaks at about 1353 cm$^{-1}$, about 1582 cm$^{-1}$, about 2711 cm$^{-1}$, and about 655 cm$^{-1}$.

16. The nanocomposite of any one of items 1 to 15, wherein the nanocomposite is characterized by a Raman spectrum exhibits an intensity ratio of the D and G band ($I_D/I_G$) of about 0.5.

17. The nanocomposite of any one of items 1 to 16, wherein the nanocomposite is characterized by a Raman spectrum as shown in FIG. 9.

18. The nanocomposite of any one of items 1 to 17, wherein the nanocomposite is characterized by an X-ray photoelectron spectrum comprising the following peaks about 47.6 eV, about 74 eV, about 284.2 eV, about 232 eV, about 642 eV, about 653.7 eV, about 771.8 eV, and about 901.5 eV.

19. The nanocomposite of any one of items 1 to 18, wherein the nanocomposite is characterized by an X-ray photoelectron spectrum as shown in FIG. 10 or FIG. 11.

20. An electrode comprising a nanocomposite as defined in any one of items 1 to 19.

21. Use of a nanocomposite as defined in any one of items 1 to 19 to produce an electrode.

22. The electrode/use of item 20 or 21, wherein the electrode comprises a current collector and the nanocomposite disposed on the current collector.

23. The electrode/use of item 22, wherein the nanocomposite forms a film on the current collector.

24. The electrode/use of item 22 or 23, wherein the current collector is:
a metal foil or grid,
a metal foam,
a graphite plate,
a carbon foam,
a polymer film coated with a metal, or
glass coated with a metal,
wherein the metal is preferably gold (Au), platinum (Pt), titanium (Ti), copper (Cu), nickel (Ni), aluminum (Al), or stainless-steel.

25. The electrode/use of item 24, wherein the metal foil or grid may be from about 20 µm to about 30 µm thick.

26. The electrode/use of any one of items 22 to 25, wherein the current collector is a stainless-steel grid.

27. The electrode/use of any one of items 22 to 26, wherein the current collector may have a finely texture surface to form an effective contact with the nanocomposite.

28. The electrode/use of any one of items 20 to 27, wherein the electrode is free of a binder.

29. The electrode/use of any one of items 20 to 27, wherein the electrode comprises the nanocomposite in admixture with a binder.

30. The electrode/use of item 28, wherein the nanocomposite and binder are present in a nanocomposite:binder weight ratio ranging from about 50:50 to about 98:2, preferably a weight ratio of about 95:5.

31. The electrode/use of item 28 or 29, wherein the binder is Nafion® (sulfonated tetrafluoroethylene based fluoropolymer-copolymer), polytetrafluoroethylene (PTFE), or polyvinylidene fluoride (PVDF); preferably polytetrafluoroethylene (PTFE).

32. Use of the electrode of any one of items 20 to 31, as a negative or positive electrode in a symmetric or asymmetric electrochemical capacitors at a voltage window of up to about 2.0 V.

33. A method for producing a graphene material/metal compound nanocomposite comprising flakes of a graphene material and a metal compound distributed on the surface of the flakes, the method comprising the step of electrochemically exfoliating graphite in an exfoliation electrolyte comprising an intercalant and a precursor which is:
an oxometallate,
a polyoxometalate,
a thiometallate, or
a metal salt together with an acid.

34. The method of item 33, wherein the flakes of a graphene material are reduced graphene oxide flakes, preferably few-layer reduced graphene oxide flakes.

35. The method of item 33 or 34, wherein the metal compound is a metal oxide, a metal hydroxide, a metal oxyhydroxide, or a metal sulfide, preferably a metal oxide or a metal sulfide, and more preferably a metal oxide.

36. The method of any one of items 33 to 35, wherein the metal in the metal compound is a metal from Groups 1 to 12 of the periodic table; preferably Mn, Fe, Nb, V, Cr, Ce, Ta, Co, Ni, La, Cu, Zn, Ru, Rh, Mo, Pd, Pt, Ag, Au, Ir, W, Hf, Ta, Re, or Li; more preferably Mn, Fe, or Nb; and most preferably Mn.

37. The method of any one of items 33 to 36, wherein the metal compound is in the form of nanoparticle, structures composed by arrangements of nanoparticles, 1D, 2D, or 3D films, or other nanostructures; preferably in the form of nanoparticles.

38. The method of any one of items 33 to 37, wherein the metal compound is nanoparticles of manganese oxide, iron oxide, or niobium sulfide; preferably manganese oxide nanoparticles; and most preferably manganese(IV) oxide ($MnO_2$) nanoparticles.

39. The method of any one of items 33 to 38, wherein the nanocomposite is the reduced graphene oxide/manganese oxide nanocomposite as defined in any one of items 1 to 19.

40. The method of any one of items 33 to 39, wherein the precursor is an oxometallate or a polyoxometalate; preferably an oxometallate; more preferably a permanganate ($MnO_4^-$), most preferably with an alkaline or alkaline-earth metal counterion, such as $K^+$.

41. The method of any one of items 33 to 40, wherein the precursor is a permanganate salt, preferably an alkali metal permanganate salt, and most preferably potassium permanganate ($KMnO_4$).

42. The method of any one of items 33 to 41, wherein the oxometallate, polyoxometalate, or thiometallate is present in the electrolyte in a concentration ranging from about 1 to about 100 mM, preferably from about 10 mM to about 80 mM, and most preferably at a concentration of 20 mM.

43. The method of any one of items 33 to 39, wherein the metal precursor is a metal salt with an acid.

44. The method of any one of items 33 to 39 and 43, wherein the metal salt is a metal sulfate, sulfite, thiosulfate, sulfide, oxalate, carboxylate, phosphate, phosphite, hydrogen phosphate, dihydrogen phosphate, chloride, fluoride, iodide, bromide, nitrate, nitrite, or perchlorate; preferably a metal sulfate or oxalate.

45. The method of any one of items 33 to 39, 43, and 44, wherein the metal salt is iron sulfate or niobium oxalate.

46. The method of any one of items 33 to 39 and 43 to 45, wherein the metal salt is present in the electrolyte in a concentration ranging from about 1 mM to about 100 mM, preferably from about 10 mM to about 80 mM and most preferably at a concentration of about 20 mM.

47. The method of any one of items 33 to 39 and 43 to 46, wherein the acid is a strong mineral acid, preferably $H_2SO_4$.

48. The method of any one of items 33 to 39 and 43 to 47, wherein the acid is present in the electrolyte in a concentration ranging from about 0.01 M to 10 M, preferably from about 0.05 M to about 5 M, and most preferably at a concentration of about 0.1 M.
49. The method of any one of items 33 to 48, wherein the electrochemical exfoliation comprises the steps of:
   1) providing an electrochemical cell comprising:
      a. a working graphite electrode;
      b. a counter electrode; and
      c. an electrolyte comprising an intercalant and the precursor, and
   2) applying a potential difference between the working graphite electrode and the counter electrode, thereby exfoliating the working graphite electrode into flakes of a graphene material and producing the metal compound distributed on the surface of the flakes.
50. The method of any one of items 33 to 49, wherein the electron accepting intercalant is an acid and or a mixture of acids; preferably $H_2SO_4$.
51. The method of item 50, wherein the acid or mixture of acids is present in the electrolyte in concentration ranging from about 0.1M to about 10M, preferably at a concentration of 0.1 M.
52. The method of any one of items 33 to 51, wherein the working graphite electrode is a graphite foil.
53. The method of any one of items 33 to 52, wherein the counter electrode is made of metal (such as, from most to least preferred, platinum, stainless steel, brass, and aluminum), graphite (such as graphite foil), or carbon (such as carbon foil), preferably metal, preferably platinum.
54. The method of any one of items 33 to 53, wherein the counter electrode is in the form of a mesh (e.g. a metal mesh, preferably a platinum mesh) or a foil (e.g. a graphite foil).
55. The method of any one of items 33 to 54, further comprising the steps of:
   isolating and washing the flakes of graphene material produced, e.g. with water,
   dispersing graphene material produced in water by sonication bath,
   freeze-drying the flakes of graphene material produced, and/or
   thermally treating the flakes of graphene material produced.

BRIEF DESCRIPTION OF THE DRAWINGS

In the appended drawings.

DETAILED DESCRIPTION OF THE INVENTION

Turning now to the invention in more details, there is provided a reduced graphene oxide/manganese oxide nanocomposite, an electrode comprising this nanocomposite, and a method for producing this nanocomposite.

As will be explained herein, this nanocomposite, especially when made by the method described below, yields electrodes with advantageous properties, including a surprisingly high operating voltage compared to similar electrode make of similar manganese oxide and graphene material composites.

As will be seen below, the method for production of the nanocomposite can be used for the production of other nanocomposites, including those with different metal compounds and/or different graphene materials.

Nanocomposite of the Invention

First, there is provided a reduced graphene oxide/manganese(IV) oxide nanocomposite comprising reduced graphene oxide flakes and manganese oxide nanoparticles distributed on the surface of the flakes.

In preferred embodiments, this nanocomposite is made by the method of production described herein below.

As discuss in further details in a separate section below, this nanocomposite yields electrodes with advantageous properties, including a surprisingly high operating voltage compared to similar electrode made of similar manganese oxide and reduced graphene oxide (or other graphene materials) composites.

Herein, manganese(IV) oxide has its common meaning in the art, i.e. it refers to $MnO_2$, also called manganese dioxide.

In embodiments, the nanocomposite consists of the reduced graphene oxide flakes and the manganese(IV) oxide nanoparticles.

In embodiments, the reduced graphene oxide flakes range from about 1 μm to about 15 μm, preferably from about 1 μm to about 10 μm, and more preferably from about 3 μm to about 10 μm in lateral size.

In embodiments, the reduced graphene oxide flakes are few-layer flakes of the graphene material. For example, the flakes may comprise between 1 and 9 layers, preferably between 1 and 8 layers, more preferably between 1 and 5 layers.

In embodiments, the manganese oxide nanoparticles are rod-shaped. In preferred embodiments, the rod-shaped nanoparticles are about 100 nm to about 300 nm, preferably about 150 nm to about 250 nm, and more preferably about 200 nm in average length. In preferred embodiments, the rod-shaped nanoparticles are about 20 nm to about 50 nm, preferably about 30 nm to about 40 nm, and more preferably about 35 nm in average width. Occasionally, some of the nanoparticles can form aggregates, which are up to 1 μm in size.

In embodiments, the $MnO_2$ loading in the nanocomposite, for example as measured by thermogravimetric analysis (TGA), is about 30 wt % to about 50 wt %, preferably about 35 wt % to about 45 wt %, and more preferably about 40 wt %, based on the total weight of the nanocomposite.

Figure 12:
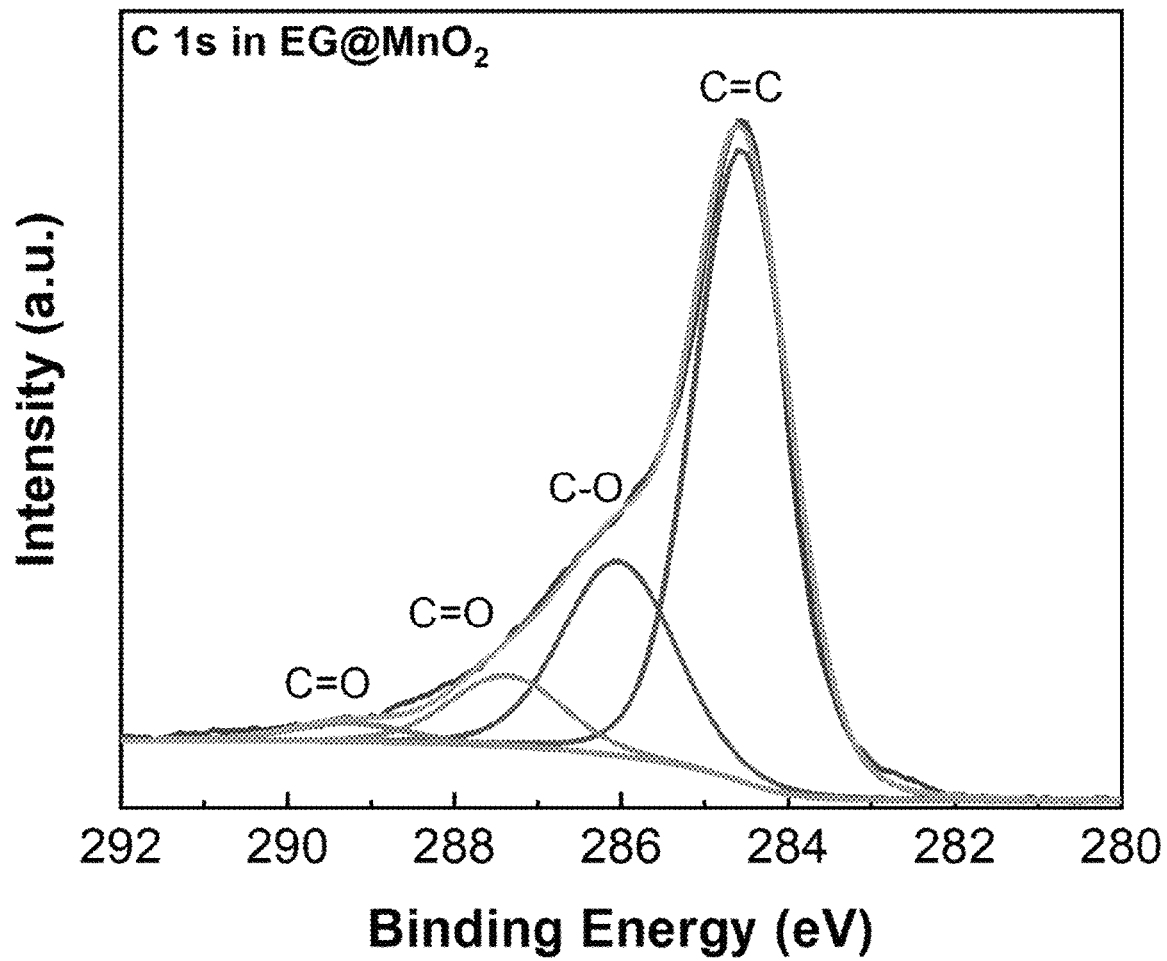
FIG. 12 shows the high-resolution XPS spectrum of the EG@$MnO_2$ composite prepared in Example 1, centered on the C 1s peaks region.

In preferred embodiments, the only elements present in the nanocomposite, e.g. as detected by an energy dispersive X-ray detector (EDX) on a SEM microscope and/or by energy-dispersive X-ray spectroscopy (EDS), are carbon, oxygen, and manganese. In more preferred embodiments, the nanocomposite is characterized by an energy-dispersive X-ray spectrum as shown in FIG. 12.

Figure 8:
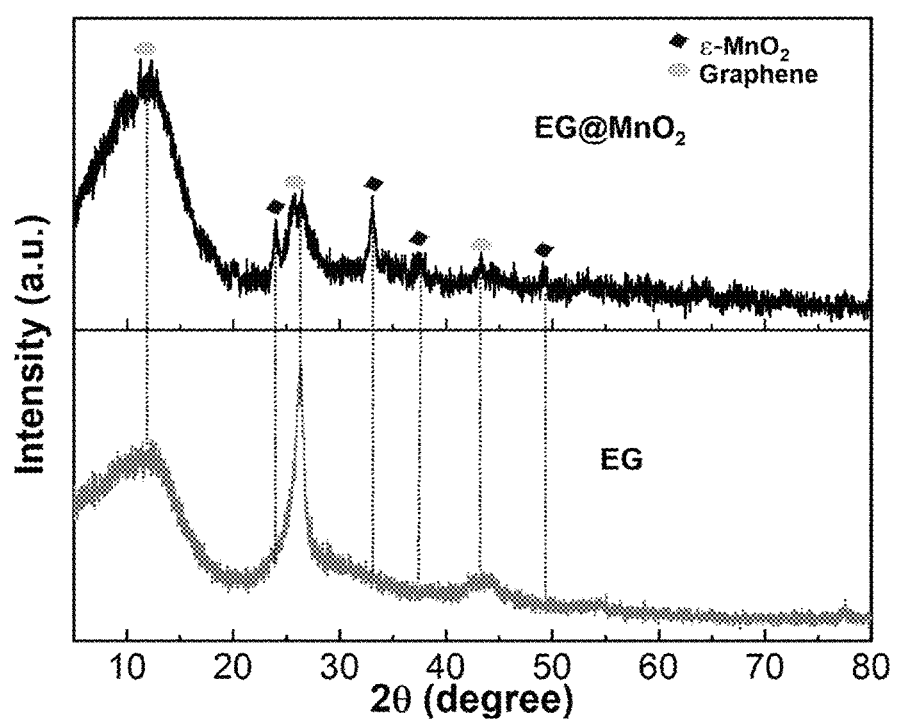
FIG. 8 shows the X-ray diffraction patterns of unmodified graphene powder (EG) and the EG@$MnO_2$ composite prepared in Example 1. The peaks attributed to the manganese dioxide particles are identified by lozenge (*), while circles identify graphene.

In embodiments, the nanocomposite is characterized by an X-ray diffraction pattern comprising 2θ peaks at about 12.30°, about 24.06°, about 33.06°, and about 37.56° and preferably peaks at about 12.30°, about 24.06°, about 33.06°, about 37.56°, about 43.3°, and about 49.1°. In more preferred embodiments, the nanocomposite is characterized by an X-ray diffraction pattern as shown in FIG. 8, top curve.

In embodiments, the nanocomposite is characterized by a Raman spectrum comprising peaks at about 1353 $cm^{-1}$ (D band), about 1582 $cm^{-1}$ (G band), about 2711 $cm^{-1}$ (2D band), and about 655 $cm^{-1}$ (M-O band). Preferably, the intensity ratio of the D and G band ($I_D/I_G$) is about 0.5. Indeed, the defect levels in reduced graphene oxide can be characterized using the $I_D/I_G$ ratio, which is intensity ratio of the D and G bands as measured by Raman spectroscopy. Indeed, the D band (located at about 1350 $cm^{-1}$) results from the presence of vacancies or dislocations in the graphene layer and at the edge of this layer. This band is also related to the presence of defects in the material. The G band is related to the in-plane vibration of $sp^2$ hybridized carbon atoms and is located at about 1580 $cm^{-1}$.

Figure 9:
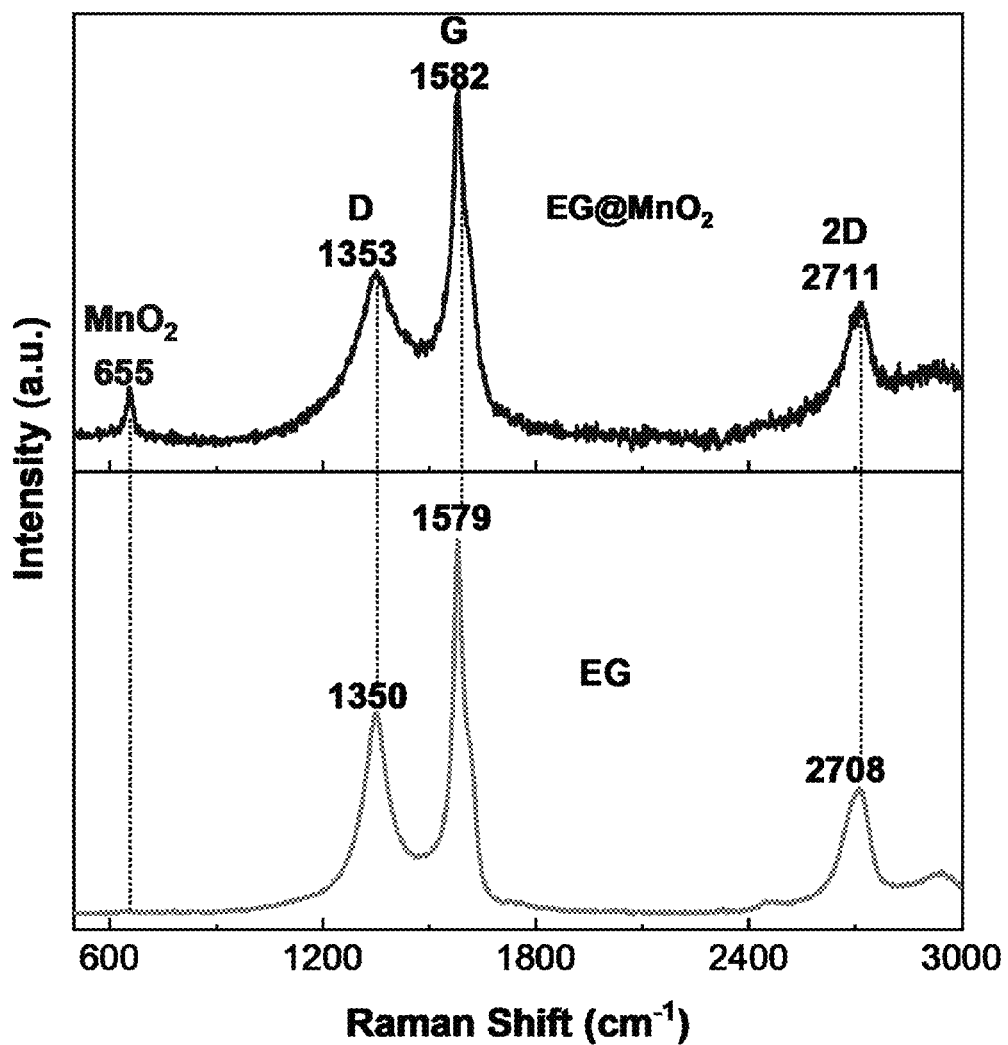
FIG. 9 shows the Raman spectra of unmodified graphene powder (EG) and the EG@$MnO_2$ composite prepared in Example 1.

In more preferred embodiments, the nanocomposite is characterized by a Raman spectrum as shown in FIG. 9.

Figure 10:
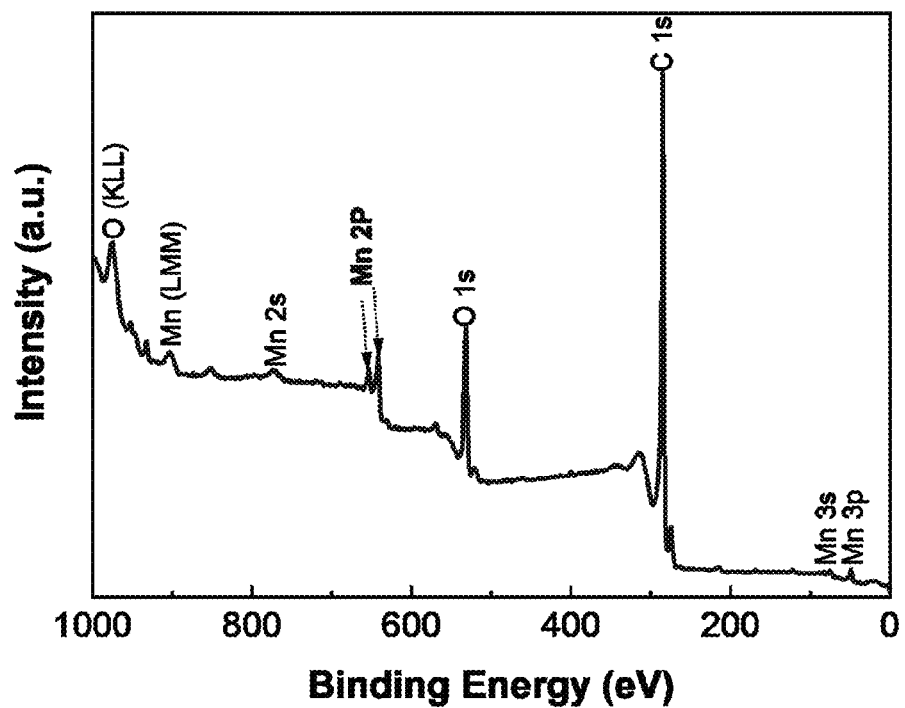
FIG. 10 shows the survey XPS spectrum of the EG@$MnO_2$ composite prepared in Example 1.
Figure 11:
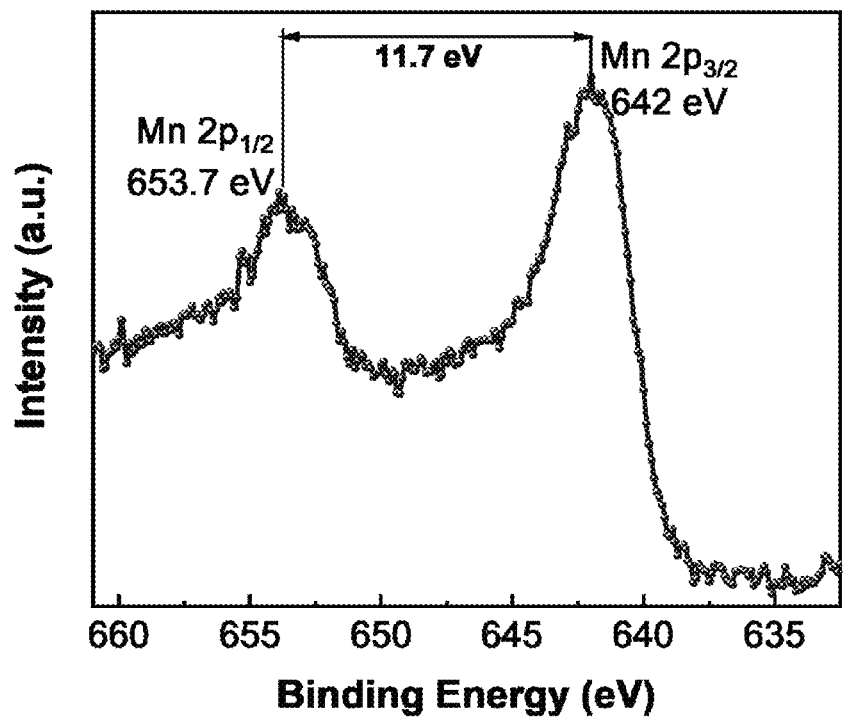
FIG. 11 shows the high-resolution XPS spectrum of the EG@$MnO_2$ composite prepared in Example 1, centered on the Mn 2p peaks region.

In embodiments, the nanocomposite is characterized by an X-ray photoelectron spectrum comprising the following peaks about 47.6 eV (Mn 2p), about 74 eV (Mn 3s), about 284.2 eV (C 1s), about 232 eV (O 1s), about 642 eV (Mn $2p_{3/2}$), about 653.7 eV (Mn $2p_{1/2}$), about 771.8 eV (Mn 2s), and about 901.5 eV (Mn (LMN)). In more preferred embodiments, the nanocomposite is characterized by an X-ray photoelectron spectrum as shown in FIG. 10 and FIG. 11.

In embodiments, the nanocomposite has a surface % O/% C ratio, as measured by XPS analysis of about 0.3.

Electrodes Comprising the Nanocomposite of the Invention

In another aspect of the invention, there is provided an electrode comprising the reduced graphene oxide/manganese(IV) oxide nanocomposite described above as well as the use of this nanocomposite to produce as an electrode material and to produce an electrode.

In embodiments, the electrode comprises a current collector and the nanocomposite disposed on the current collector.

In embodiments, the nanocomposite forms a film on the current collector.

In embodiments, the electrode does not comprise a binder. In other embodiments, the electrode comprises the nanocomposite in admixture with a binder. Non-limiting examples of binder include Nafion® (sulfonated tetrafluoroethylene based fluoropolymer-copolymer), polytetrafluoroethylene (PTFE) and polyvinylidene fluoride (PVDF). A preferred binder is a polytetrafluoroethylene (PTFE) binder. In embodiments, the nanocomposite and binder are present in a nanocomposite:binder weight ratio ranging from about 50:50 to about 98:2, preferably a weight ratio of about 95:5.

In embodiments, the current collector is:
a metal foil or grid,
a metal foam,
a graphite plate,
a carbon foam,
a polymer film coated with a metal, or
glass coated with a metal, wherein, in all cases, the metal is preferably gold (Au), platinum (Pt), titanium (Ti), copper (Cu), nickel (Ni), aluminum (Al), or stainless-steel. A preferred current collector is a stainless-steel grid.

In embodiments, the metal foil or grid may be from about 20 μm to about 30 μm thick. Furthermore, in embodiments, the current collector may have a finely texture surface to form an effective contact with the nanocomposite.

The electrode may be used in variety of electric devices. Non-limiting examples of such devices include:
- energy storage devices, such as a secondary battery (in particular lithium-ion batteries), fuel cells, and solar cells;
- electrochemical capacitors;
- electrochemical capacitor display devices such as a field emission display (FED), a liquid crystal display (LCD), and an organic light-emitting diode (OLED);
- nanodevices such as a field effect transistors (FET) and memory devices; and
- electric devices such as hydrogen storage bodies, optical fibers, and sensors.

Preferred devices in which the electrode of the invention is used include lithium-ion secondary batteries, electrochemical capacitors, and sensors, more preferably lithium-ion secondary batteries and electrochemical capacitors, and most preferably electrochemical capacitors.

In particular, the electrode of the invention can be used as a negative or positive electrode in symmetric or asymmetric electrochemical capacitors using neutral electrolytes. It is well recognized in the art that the low operating voltage (typically ~1 V, due to $H_2/O_2$ evolution reactions) as observed e.g. in Salanne et al., Nat. Energy 1, 16070-16080 (2016) and in Bakandritsos et al., FlatChem 13, 25-33 (2019), both of which are incorporated herein by reference, in aqueous electrolyte is the main limitation of electrochemical capacitors.

The electrode of the invention has shown to have a surprisingly high operating voltage and to be surprisingly stable. More specifically, as seen from FIG. 17, such electrode exhibited a near rectangular-shaped and symmetric CV curve at 20 mV s$^{-1}$, which is typical of an ideal capacitive behavior—see Li et al., J. Mater. Chem. 21, 14706-14711 (2011), incorporated herein by reference. Its excellent electrochemical performance was demonstrated by a larger gravimetric current density compared to the pure graphene electrode.

Figure 18:
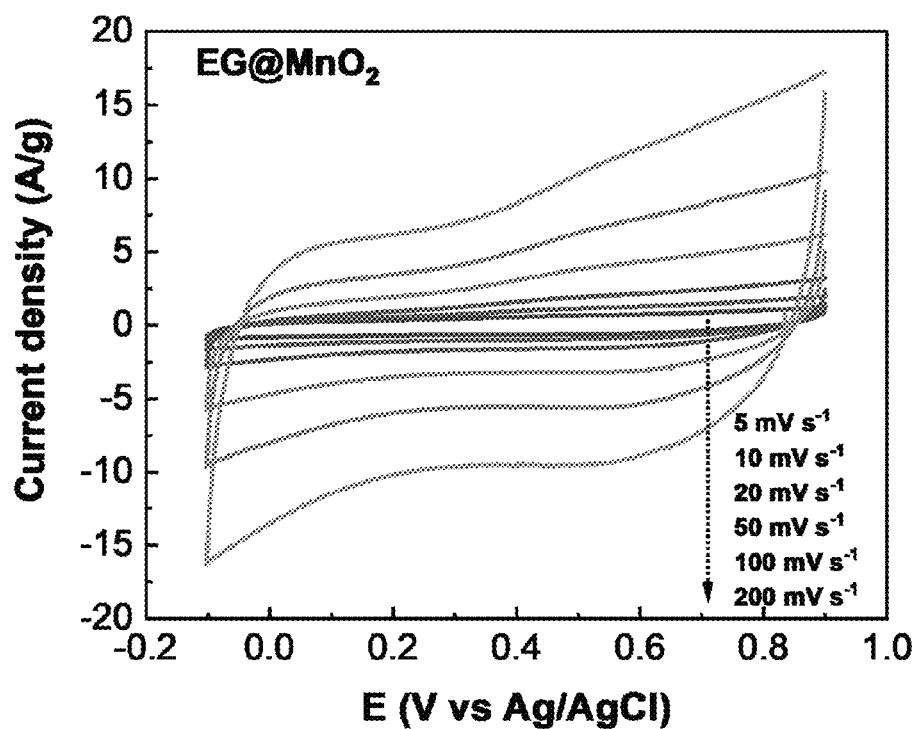
FIG. 18 shows the CV curves of an EG@$MnO_2$ composite electrode as prepared in Example 2a recorded in 1 M $Na_2SO_4$ at different scan rates of 5, 10, 20, 50, 100 and 200 mV s$^{-1}$.

The current density in the CV curves increased gradually with the increased of the scan rate from 10 to 200 mV s$^{-1}$ as seen in FIG. 18. As shown, the CV curves of the nanocomposite electrode were close to rectangular at the applied scan rates including the high scan rate of 200 mV s$^{-1}$, indicating fast charge-discharge processes in 1 M $Na_2SO_4$ solution and a low contact resistance in the supercapacitor. This behavior suggests an excellent capacitive behavior of the nanocomposite.

The hybrid material shows a noticeably higher specific capacity than non-functionalized graphene material.

Figure 20:
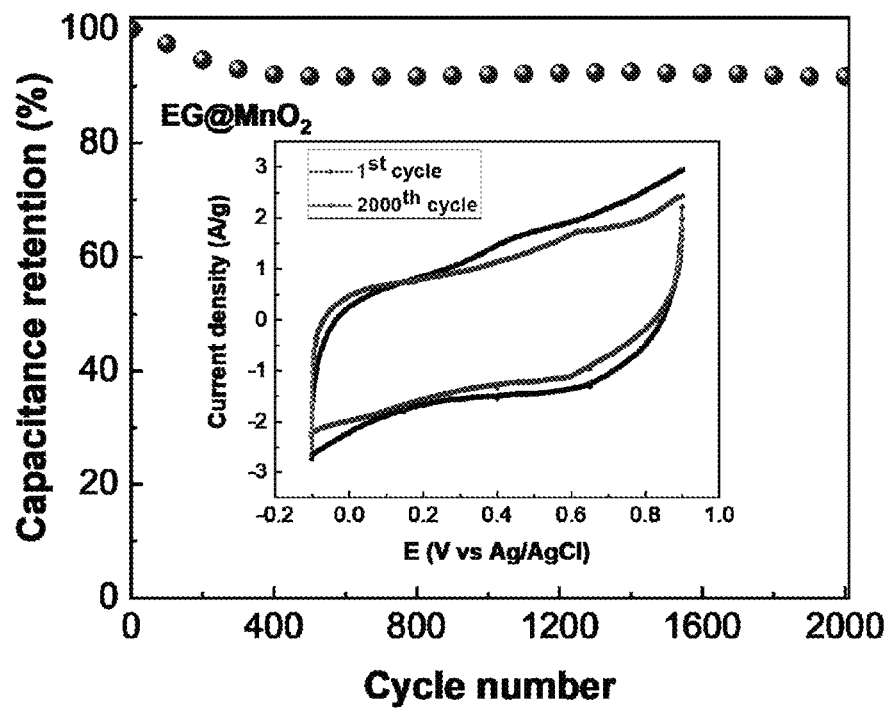
FIG. 20 shows the capacitance retention of an EG@$MnO_2$ composite electrode as prepared in Example 2a as a function of the cycle number up to 2000 cycles.

Good cycling stability is of paramount importance for supercapacitors. FIG. 20 shows the cyclic electrochemical performance of the nanocomposite electrode at scan rate of 20 mV s$^{-1}$ for 2000 cycles in 1 M $Na_2SO_4$. After 2000 cycles, the retention of the initial capacitance is 92%, which points out for the remarkable cycle stability.

Figure 21:
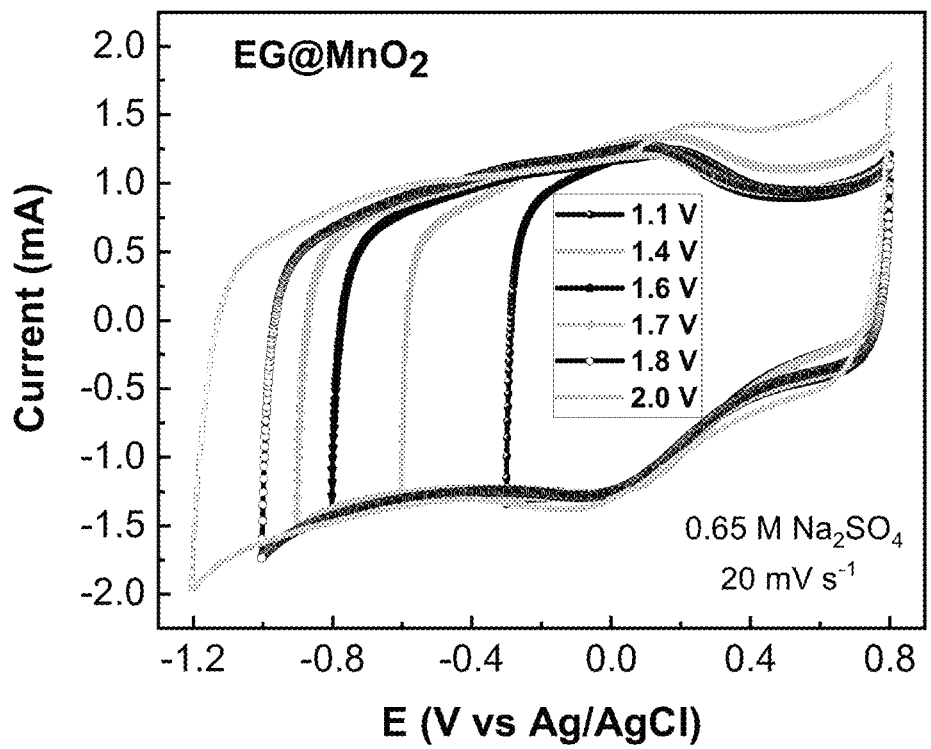
FIG. 21 shows the CV curves of an EG@$MnO_2$ composite electrode as prepared in Example 2b at different operation voltages recorded in 0.65 M $Na_2SO_4$ at the scan rate of 20 mV s$^{-1}$.

As seen from FIG. 21, the electrode displayed a broad voltage window of 2.0 V. Thus, it could be used as negative or positive electrode for symmetric or asymmetric electrochemical capacitors (ECs).

Method for Producing Nanocomposites

In another aspect of the invention, there is provided a method for producing a graphene material/metal compound nanocomposite comprising flakes of a graphene material and a metal compound distributed on the surface of the flakes.

In preferred embodiments, this nanocomposite is the reduced graphene oxide/manganese oxide nanocomposite described above. However, as will be seen below, the method for production of the nanocomposite can be used to produce other nanocomposites, including those containing different metal compounds and/or different graphene materials.

Such graphene materials include graphene, graphene oxide, as well as reduced graphene oxide. These three types of graphene are well-known and shown below. Graphene oxide is graphene that is oxidized, while reduced graphene oxide is graphene oxide that is more or less reduced.

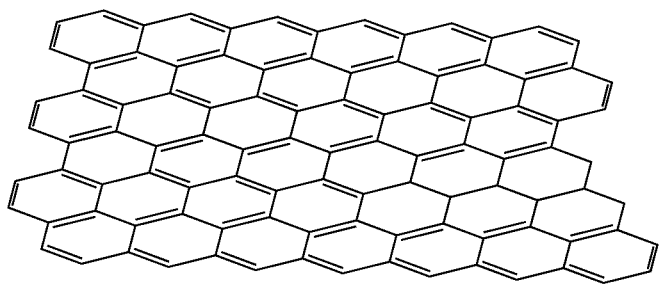

PRISTINE GRAPHENE

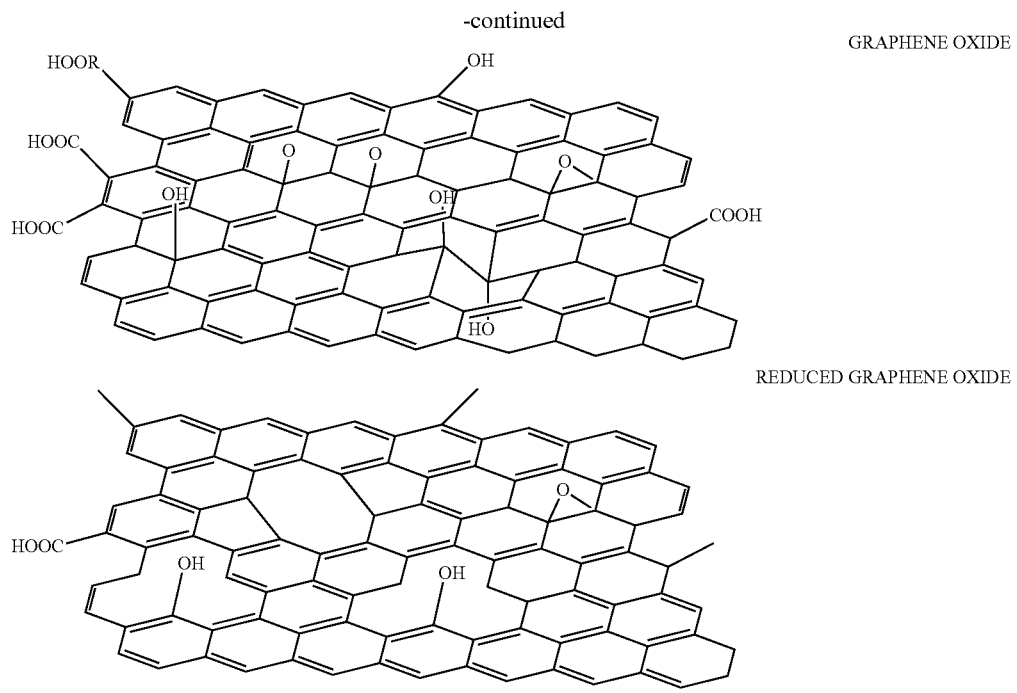

In preferred embodiments, the flakes of a graphene material in the nanocomposite produced by the method of the invention are reduced graphene oxide flakes, preferably few-layer reduced graphene oxide flakes.

In embodiments, the flakes of the graphene material are few-layer flakes of the graphene material. For example, the flake may comprise between 1 and 9 layers, preferably between 1 and 8 layers, more preferably between 1 and 5 layers, yet more preferably between 1 and 3 layers, 1 or 2 layers, and preferably only one layer.

In embodiments, the flakes of a graphene material range from about 500 nm to about 100 µm, preferably from about 1 µm to about 15 µm, and preferably up to about 10 µm in lateral size.

The metal compound distributed on the surface of the flakes can be a metal oxide, a metal hydroxide, a metal oxyhydroxide, or a metal sulfide. In preferred embodiments, the metal compound is a metal oxide or a metal sulfide, preferably a metal oxide.

Herein, the terms "metal oxide", "metal hydroxide", "metal oxyhydroxide", and "metal sulfide" have their regular meanings in the art. Namely, metal oxides are compounds made of metal cation(s) and oxygen anion(s) ($O^{2-}$); metal hydroxides are compounds made of metal cation(s) and $OH^-$ anion(s); metal oxyhydroxides, also called metal oxide-hydroxide, are compounds made of metal cation(s) and both oxygen anion(s) ($O^{2-}$) and $OH^-$ anion(s); and metal sulfide are compounds made of metal cation(s) and sulfur anion(s) ($S^{2-}$).

The metal in the metal compound can be any metal from Groups 1 to 12 of the periodic table. In preferred embodiments, the metal is Mn, Fe, Nb, V, Cr, Ce, Ta, Co, Ni, La, Cu, Zn, Ru, Rh, Mo, Pd, Pt, Ag, Au, Ir, W, Hf, Ta, Re, or Li. Preferably, the metal is Mn, Fe, or Nb. More preferably, the metal is Mn.

The metal compound distributed on the surface of the flakes can take various forms. For example, it can form nanoparticles; structures composed by arrangements of nanoparticles; 1D, 2D, or 3D films; or other nanostructures. In preferred embodiments, the metal compound is in the form of nanoparticles.

In preferred embodiments, the metal compound is nanoparticles of manganese oxide, preferably manganese(IV) oxide ($MnO_2$), iron oxide, or niobium sulfide. More preferably, the metal compound is manganese(IV) oxide ($MnO_2$) nanoparticles.

The method for producing a graphene material/metal oxide nanocomposite comprises the step of electrochemically exfoliating graphite in an exfoliation electrolyte comprising an intercalant and a precursor which is:
an oxometallate,
a polyoxometalate,
a thiometallate, or
a metal salt together with an acid.

This method is based on the well-know electrochemical exfoliation of graphite to produce graphene materials in an electrolyte comprising an intercalant. However, the inventors have found that adding the above precursor to the electrolyte used for electrochemical exfoliation surprisingly leads to the formation of metal compound distributed on the surface of the graphene.

Herein, the terms that "oxometallate" and "thiometallate" have their regular meanings in the art. Namely, "metallates" are defined complex anions containing a metal ligated to several atoms or small groups. Typically, the metal is one of the transition elements and the ligand is oxygen or another element of Group 16, such as sulfur, or a cyanide group (though others are known). Metallates in which the ligand is oxygen are called "oxometallates" and include, for example permanganate ($MnO_4^-$), chromate ($CrO_4^{2-}$) and vanadate ($VO_3^-$ or $VO_4^{3-}$). Metallates in which the ligand is sulfur are called "thiometallates" and include, for example, tetrathiovanadate ($VS_4^{3-}$), tetrathiomolybdate ($MoS_4^{2-}$), tetrathiotungstate ($WS_4^{2-}$). Note that "metallates", "oxometallate" and "thiometallate" are often spelled "metalates", "oxometalate" and "thiometalate".

Similarly, the term "polyoxometalate" has its regular meaning in the art. Namely, it refers to a polyatomic ion, usually an anion, that consists of three or more transition metal oxyanions linked together by shared oxygen atoms to form closed 3-dimensional frameworks. The metal atoms are usually group 6 (Mo, W) or less commonly group 5 (V, Nb, Ta) transition metals in their high oxidation states. Heteroatoms are present in many polyoxometalates. Examples of polyoxometalate include polyoxotantalates, polyoxoniobates (also referred to polyniobiates, such as $Nb_6O_{19}^{8-}$ and $Nb_{10}O_{28}^{6-}$), and polyoxovanadates.

Herein, the term "oxyanion" has its regular meaning in the art. Namely, it refers ions with the generic formula $A_xO_y^{z-}$ (where A represents a chemical element and O represents an oxygen atom).

During the electrochemical graphite exfoliation graphite, the oxometallate, polyoxometalate, thiometallate, or metal salt will be converted into the metal oxide, metal hydroxide, metal oxyhydroxide, or metal sulfide. The method simultaneously converts graphite to flakes of a graphene material and allows formation of metal compound (of various forms) distributed on the reduced graphene oxide flakes.

More specifically, the reactants and products will be:

| Precursor used | Metal compound produced |
| --- | --- |
| Oxometallate or polyoxometalate | metal oxide, metal hydroxide, or metal oxyhydroxide |
| Thiometallate | metal sulfide |
| Metal salt with an acid | metal oxide, metal hydroxide, metal oxyhydroxide, or metal sulfide |

In preferred embodiments, the electrolyte comprises an oxometallate. In more preferred embodiments, the oxometallate is permanganate ($MnO_4^-$). In yet preferred embodiments, the counterion to the oxometallate is an alkaline or alkaline-earth metal, such as $K^+$. In more preferred embodiments, the oxometallate forms a permanganate salt, preferably an alkali metal permanganate salt, and most preferably potassium permanganate ($KMnO_4$). This precursor yields $MnO_2$ nanoparticles, i.e. the reduced graphene oxide/manganese(IV) oxide nanocomposite described in the previous section. Such embodiments of the invention are particularly interesting as $MnO_2$ is one of the most promising materials for supercapacitors and Li ion batteries.

In embodiments, the oxometallate, polyoxometalate, or thiometallate is provided in the electrolyte in a concentration ranging from about 1 to about 100 mM, preferably from about 10 mM to about 80 mM, and most preferably at a concentration of 20 mM.

In other embodiments, the metal precursor is a metal salt with an acid. Non-limiting examples of metal salts for this purpose include metal sulfates ($SO_4^{2-}$), sulfites ($SO_3$), thiosulfates ($S_2O_3^{2-}$), sulfides ($S^{2-}$), oxalates ($C_2O_4^{2-}$), carboxylates (R—OOO$^-$), phosphates ($PO_4^{3-}$), phosphites ($PO_3^{3-}$), hydrogen phosphates ($HPO_4^{2-}$), dihydrogen phosphates ($H_2PO_4$), chlorides ($Cl^-$), fluorides ($F^-$), iodides ($I^-$), bromides ($Br^-$), nitrates ($NO_3^-$), nitrites ($NO_2^-$), and perchlorates ($ClO_4^-$). Preferred metal salts include metal sulfates and oxalates. Most preferred metal salts include iron sulfate or niobium oxalate, which together with the acid, produce, iron oxide and niobium sulfide, respectively.

The acid used with the metal salt is preferably a strong mineral acid, such as $H_2SO_4$. Herein, a "strong" acid is an acid that ionizes completely in a solution of water. Typically, those acids have a pKa value (in water) of −1.74 or less.

As noted above, the method of the invention comprises the well-known electrochemical exfoliation of graphite with the proviso that a precursor is added to the electrolyte used for the exfoliation in order to produce the metal compound distributed on the surface of the graphite flakes. Acids can be used as an electron accepting intercalant in electrolytes for electrochemical exfoliation of graphite. Thus, in embodiments, the acid used play a dual role: as an intercalant and as a reactant for the production of the metal compound distributed on the surface of the graphite flakes.

In embodiments, the metal salt is provided in the electrolyte in a concentration ranging from about 1 mM to about 100 mM, preferably from about 10 mM to about 80 mM and most preferably at a concentration of about 20 mM.

In embodiments, the acid is provided in the electrolyte in a concentration ranging from about 0.01 M to 10 M, preferably from about 0.05 M to about 5 M, and most preferably at a concentration of about 0.1 M.

The electrochemical exfoliation of graphite to produce flakes of graphene materials has been well described in the literature. In particular, this corpus of literature has been the subject of a recent review by Abdelkader et al. in Nanoscale, 2015, 7, 6944, which is incorporated herein by reference.

The conditions in which the method of the invention is carried out (electrodes, electrochemical exfoliation electrolyte, current, temperature, time of reaction, etc.) are generally the same as those taught in the art, except that a precursor as described above is added to the electrolyte. In particular, these conditions can be those found in Abdelkader et al. in Nanoscale, 2015, 7, 6944, incorporated herein by reference, and the documents cited therein.

In embodiments, the electrochemical exfoliation comprises the following steps:
1) providing an electrochemical cell comprising:
    a. a working graphite electrode;
    b. a counter electrode; and
    c. an electrolyte comprising an intercalant and the precursor described above and
2) applying a potential difference between the working graphite electrode and the counter electrode, thereby exfoliating the working graphite electrode into flakes of a graphene material and producing the metal compound distributed on the surface of the flakes.

During this process, the applied voltage drives ionic species to intercalate into the working graphite electrode where they may form gaseous species that expand and exfoliate the graphite into a graphene material. Electrochemical exfoliation approaches are indeed typically based on the formation of covalent or ionic graphite intercalated compounds (GICs), and the physical expansion of the electrode, which occurs as a result, is utilized to exfoliate the graphite into its constituent layers. Therefore, the electrochemical exfoliation involves an electrolyte comprising one or more intercalants that produce such GICs.

The working electrode can be either anodically or cathodically controlled (i.e. used as a cathode or an anode), depending on the charge of the ions to be intercalated into graphite. Preferably and most commonly, the working graphite electrode is used as an anode and electrochemical exfoliation occurs by intercalation of anions into the graphite anode, mostly in aqueous electrolytes. In alternative embodiments, the working graphite electrode is used as a cathode.

When the working electrode is anodically controlled, the electrolyte is typically an aqueous solution of an electron accepting intercalant. The use of ionic liquid, acting as both solvent and intercalant has also been described. These ionic liquids include nitrate ionic liquids, tetrafluoroborate ionic liquids, and triethyl sulfonium bis(trifluoromethyl sulfonyl) imide. In all cases, in the method of the invention, the precursor is simply dissolved (or mixed in the case of the acid) in such known electrolytes. Non-limiting examples of electron accepting intercalants include:

- acids, such as $H_2SO_4$, HCl, $HNO_3$, $HSO_3F$ (fluorosulfonic acid), $(HO)_2SeO_2$ (selenic acid), $HClO_4$ (perchloric acid), $H_3PO_3$ (phosphorous acid), HCOOH (formic acid), and copper phthalocyanine tetrasulfonic acid;
- sulfonate salts, such as poly(sodium-4-styrenessulfonate) (PSS), sodium dodecyl benzene sulfonate (SDBS), sodium 6-amino-4-hydroxy-2-naphthalene-sulfonate (which can be produced in situ by mixing NaOH with the corresponding acid), and sulfonated polyether ether ketone (sulfonated PEEK);
- sulfate salts, such as ammonium sulfate (($NH_4)_2SO_4$), sodium sulfate ($Na_2SO_4$), potassium sulfate ($K_2SO_4$), and metal sulfate salts, including for example metal dodecyl sulfate salts (e.g. sodium dodecyl sulfate);
- nitrate salts, such as $KNO_3$;
- chlorides salts, such as $FeCl_3$;
- perchlorate salts, such as sodium perchlorate and lithium perchlorate;
- phosphate salts, such as phosphate buffer;
- tetrafluoroborate salts;
- carboxylate salts, such as 9-anthracene carboxylate; and
- bases, such as sodium hydroxide, potassium hydroxide, and ammonium hydroxide, optionally with hydrogen peroxide, as well as mixtures thereof. In embodiments, the electron accepting intercalants are present in the electrolyte at a concentration ranging from about 0.1M to about 10M.

In preferred embodiments, the electron accepting intercalant is an acid and or a mixture of acids as described above. A most preferred electron accepting intercalant is $H_2SO_4$. In embodiments, these acids (e.g. $H_2SO_4$) are present in the electrolyte in concentration ranging from about 0.1M to about 10M, preferably at a concentration of 0.1 M.

In embodiments, the electrolyte may further comprise one or more base such as KOH or NaOH. Such embodiments are more common when the intercalant is an acid (or a mixture thereof) or a carboxylate salt.

In embodiments, the electrolyte may further comprise an antioxidant such as $Co^{2+}$ to reduce surface oxidation of the graphene material to be produced. Such embodiments are particularly suitable when the electron accepting intercalant is a sulfate salt, such as $Na_2SO_4$, e.g. at about 0.2M, as taught by Ejigu et al., ACS Appl. Mater. Interfaces 2019, 11, 23261-23270, incorporated herein by reference. In embodiments, the $Co^{2+}$ is provided in the electrolyte as $CoSO_4$, for example at about 30 mM.

The working graphite electrode is typically made of a graphite monolith (as opposed to a loose graphite powder) because it must be electrically conductive and connected to the external power supply. Indeed, graphite rods, films, and foils as well as highly oriented pyrolytic graphite (HOPG) are typically used as working electrodes. Herein, the expression "highly oriented pyrolytic graphite" carries its recognized meaning in the art as defined by IUPAC: a pyrolytic graphite with an angular spread of the c-axes of the crystallites of less than 1 degree.

A preferred working graphite electrode is a graphite foil.

However, graphite powders can also be used. For example, graphite flakes (preferably without any binder) inside a permeable container can be used as the working electrode as described in Achee et al., Scientific Reports (2018) 8:14525, incorporated herein by reference. The graphite flakes are pressed together by a movable clip to form an electrically conductive electrode. To connect the graphite flakes with the power supply, a piece of e.g. platinum wire (current collector) is inserted in the permeable container.

In embodiments, the counter electrode can be made of metal (such as, from most to least preferred, platinum, stainless steel, brass, and aluminum), graphite (such as graphite foil), or carbon (such as carbon foil), preferably metal, preferably platinum. In preferred embodiments, the counter electrode is in the form of a mesh (e.g. a metal mesh, preferably a platinum mesh) or a foil (e.g. a graphite foil).

Typically, the potential difference applied to the cell may range from about +1V to about +20 V for times ranging between a few minutes (e.g. about 5 minutes) up to several hours (e.g. about 48 hours), depending on the electrolyte used. In typical embodiments, the electrochemical exfoliation is complete in a few hours and, when acids are used, typically under 30 minutes. Sometimes, an increasing voltage gradient can be used. Preferred voltages range from about 4V to about 12V, preferably about 8V.

Step 2) can carried out from room temperature up to about 70° C. In preferred embodiments, step 2) is carried out from room temperature up to about 50° C., preferably at about 50° C.

In embodiments, the cell may comprise more than one working electrode and/or more than one counter electrode to increase yield. In preferred such embodiments, the cell comprises a stack of n working electrodes and n+1 counter electrodes (n being an integer ≥1), wherein each working electrodes is preferably located between two counter electrodes, as described in Kwon et al., Adv. Mater. Interfaces 2019, 6, 9, 1900095, incorporated herein by reference.

As well known to the skilled person, the pH of the solution affects the kinetics of the intercalation and determines the type of the graphene material produced. In acidic media, the intercalation is easier and so the expanded graphite particles may physically drop from the anode without complete exfoliation of the graphene sheets. This is typically independent of the type of graphite employed as the anode material. This process results in relatively low yield of the graphene materials, and the produced graphene platelets are typically 'thick', consisting of many graphene layers, as well as closely resembling graphene oxide materials, in terms of surface oxidation, as opposed to pristine graphene.

Therefore, in some embodiments, especially those in which the electron accepting intercalant is an acid and or a mixture of acids as described above, the method of the invention further comprises the step of sonicating, thus increasing the quantity flakes of graphene material produced. This sonicating step can be carried out during step 2) (i.e. the electrochemical cell is sonicated while voltage is applied) or as a separate step after step 2) (i.e. the product produced during step 2) is sonicated).

In embodiments, the method of the invention further comprises the steps of:
- isolating and washing the flakes of graphene material produced, e.g. with water,
- dispersing graphene material produced in water by sonication bath,
- freeze-drying the flakes of graphene material produced, and/or
- thermally treating the flakes of graphene material produced, for example thermal-treating the graphene material produced to remove any solvent still trapped in the powders, e.g. at about 200° C. under an inert atmosphere, e.g. Argon, for about 1 h.

Other advantages of the method of the invention include the following:
- it is a single-step method, which both produces graphene and functionalizes it with the metal compound in one step (i.e. the electrochemical exfoliation step);
- it produces a variety of graphene material/metal compound nanocomposites, which could be used for different applications;
- it is reliable and effective;
- it is easy to implement and based on a well-known method (electrochemical exfoliation of graphite); and
- like the conventional electrochemical exfoliation of graphite, it is scalable, has a relatively high yield, is fast, is sustainable, and uses environmentally friendly solvents.

Definitions

The use of the terms "a" and "an" and "the" and similar referents in the context of describing the invention (especially in the context of the following claims) are to be construed to cover both the singular and the plural, unless otherwise indicated herein or clearly contradicted by context.

The terms "comprising", "having", "including", and "containing" are to be construed as open-ended terms (i.e., meaning "including, but not limited to") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. All subsets of values within the ranges are also incorporated into the specification as if they were individually recited herein.

All methods described herein can be performed in any suitable order unless otherwise indicated herein or otherwise clearly contradicted by context.

The use of any and all examples, or exemplary language (e.g., "such as") provided herein, is intended merely to better illuminate the invention and does not pose a limitation on the scope of the invention unless otherwise claimed.

No language in the specification should be construed as indicating any non-claimed element as essential to the practice of the invention.

Herein, the term "about" has its ordinary meaning. In embodiments, it means plus or minus 5% of the numerical value qualified.

Unless otherwise defined, all technical and scientific terms used herein have the same meaning as commonly understood by one of ordinary skill in the art to which this invention belongs.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

Figure 1:
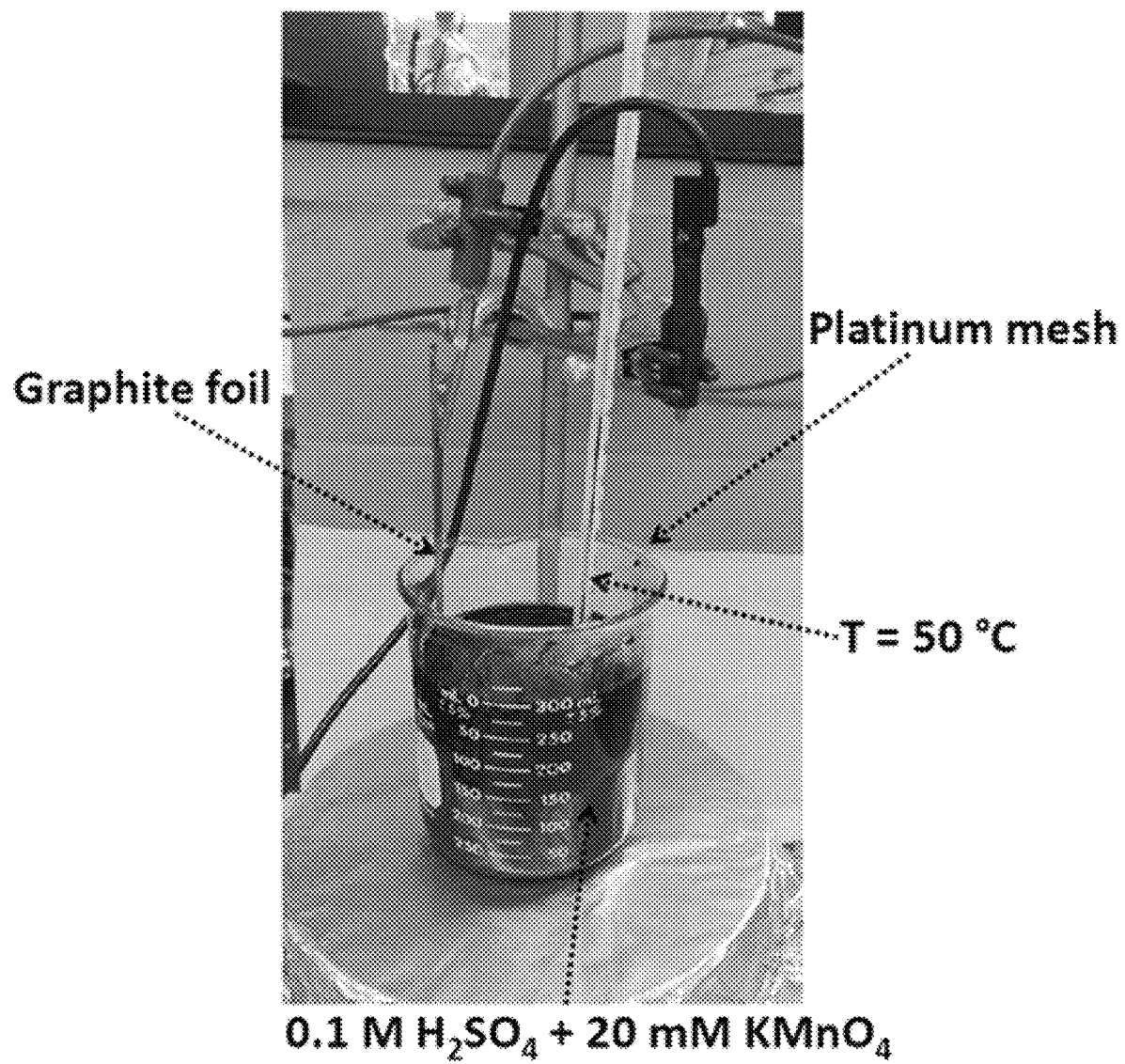
FIG. 1 shows the setup used for the synthesis of the graphene-based materials.

Example 1—Preparation and Characterization of Graphene/$MnO_2$ Composite EG@$MnO_2$ Preparation by Electrochemical Exfoliation in a $KMnO_4$/$H_2SO_4$ Solution An aqueous electrolyte was prepared by adding the salt (20 mM $KMnO_4$) into a 0.1 M $H_2SO_4$ solution. The reaction medium was maintained at ca. 50° C. during the exfoliation (as shown in FIG. 1). Graphite foil was used as positive electrode and a platinum mesh was used as negative electrode, with 8 V as applied voltage to the graphite electrode. Pure graphene (EG) without the presence of $MnO_2$ precursor was also prepared under the same conditions for comparison. In all cases, anodic exfoliation of graphite foil was observed.

After the electrochemical exfoliation process was over, the exfoliated materials were separated from the electrolyte using vacuum filtration, and thoroughly washed with Nanopure water (18.2 M$\Omega$·cm).

The powder materials were collected and dispersed during 30 min in water using ultrasonication bath, and then freeze-dried. Finally, the materials were thermal-treated at 200° C. under Argon for 1 h to remove any solvent still trapped in the powders.

Characterization by SEM/EDX

Scanning electron microscopy (SEM) was carried out using a scanning electron microscope Tescan® LYRA® 3 XMH equipped with an energy dispersive X-ray (EDX) detector QUANTAX® Compact (X-Flash 6160).

Figure 2:
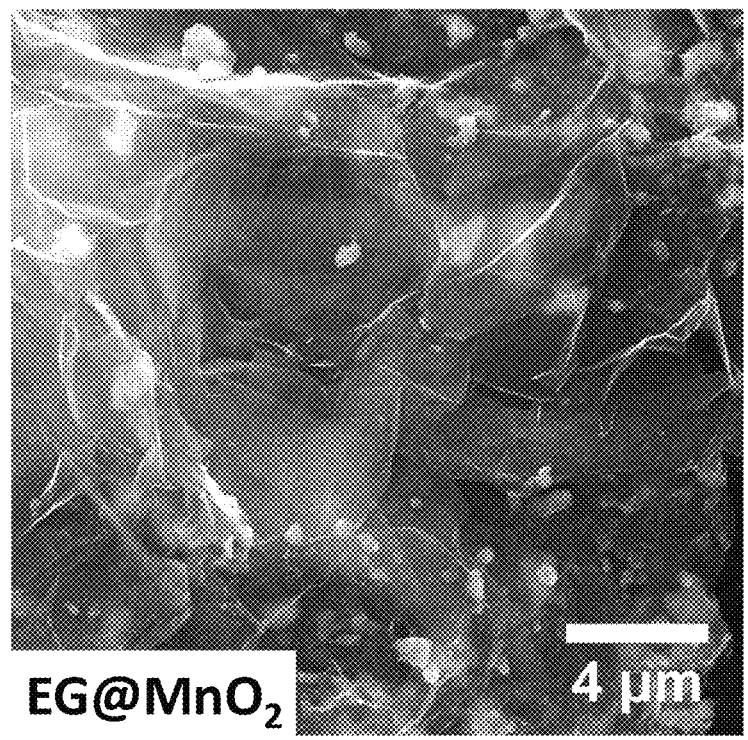
FIG. 2 shows a scanning electron microscope (SEM) image of a graphene sheets decorated with manganese dioxide (EG@$MnO_2$) as prepared in Example 1.
Figure 3:
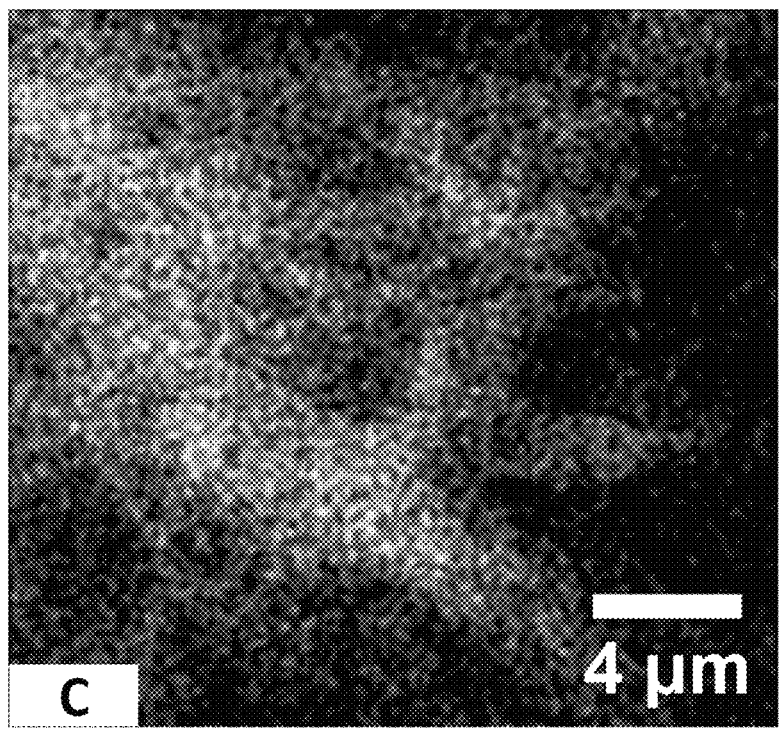
FIG. 3 shows the energy dispersive X-ray (EDX) mapping of carbon (C) in the EG@$MnO_2$ composite prepared in Example 1.
Figure 4:
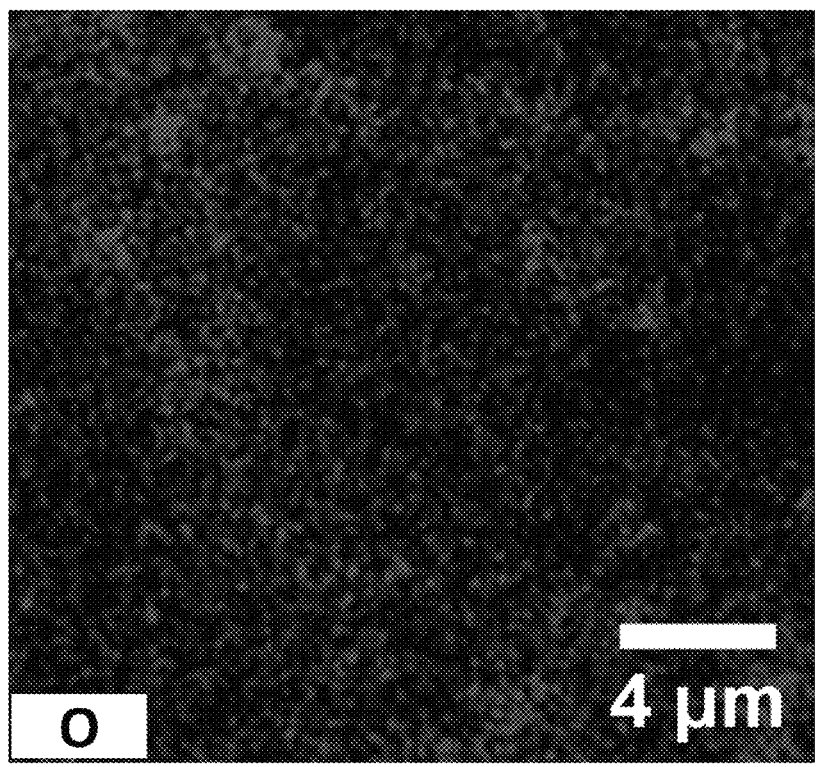
FIG. 4 shows the EDX mapping of oxygen (O) in the EG@$MnO_2$ composite prepared in Example 1.
Figure 5:
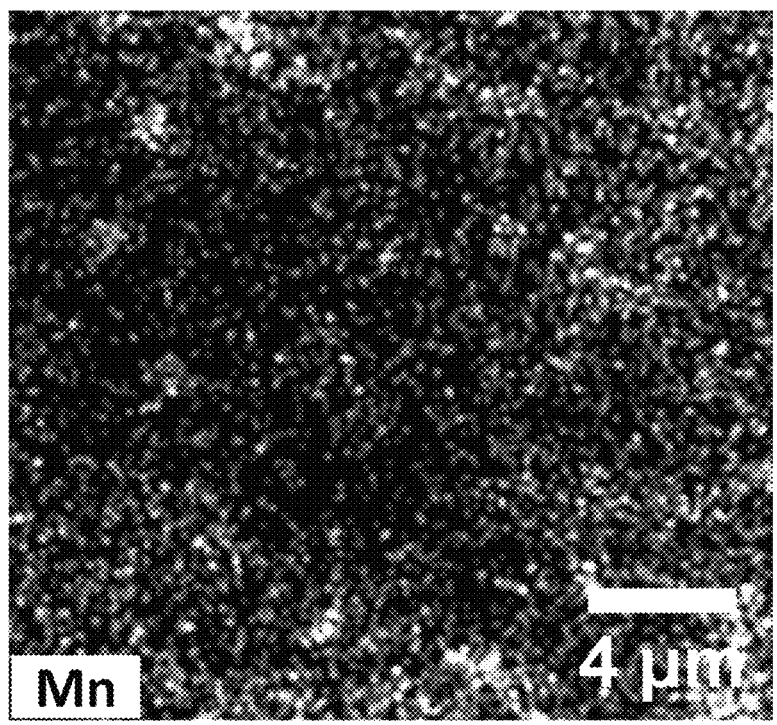
FIG. 5 shows the EDX mapping of manganese (Mn) in the EG@$MnO_2$ composite prepared in Example 1.

The morphology of the as-prepared EG@$MnO_2$ flakes was characterized by SEM and is shown in FIG. 2. The electrochemical one-step synthesis provides graphene flakes with their surface decorated by manganese oxide nanoparticles. FIGS. 3, 4 and 5 also show the EDX mapping of EG@$MnO_2$. As seen from FIG. 2, the EG@$MnO_2$ contains carbon (C, FIG. 3), manganese (Mn, FIG. 4) and oxygen (O, FIG. 5) elements only. No other elements were found.

Characterization by Thermogravimetric Analysis

Thermal stability of the pure graphene (EG) and functionalized graphene-manganese dioxide (EG@$MnO_2$) powders, and the percentage of $MnO_2$ loading on these graphene sheets were assessed by thermogravimetric analysis (TGA). These measurements were carried out under a constant air flow of 90 mL/min from 30 to 900° C. with a heating rate of 5° C./min, using TA Instruments® TGA (Q500)/Discovery® MS.

The percentage of $MnO_2$ loading was found to be 40 wt %.

Figure 6:
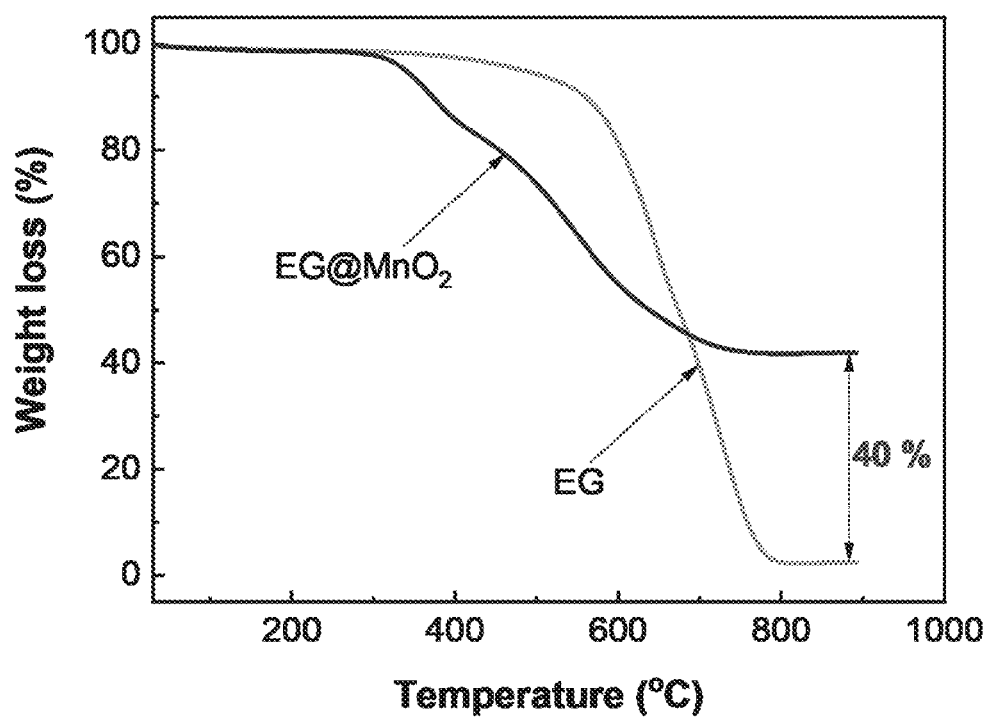
FIG. 6 shows the thermogravimetric curves of unmodified graphene powder (EG) and the EG@$MnO_2$ composite prepared in Example 1.
Figure 7:
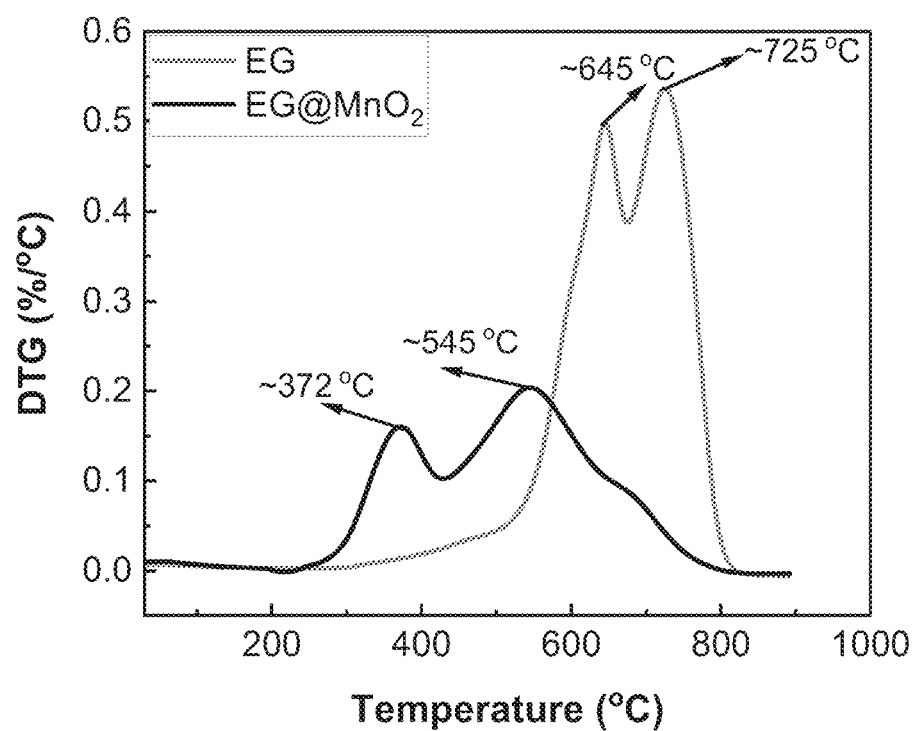
FIG. 7 shows the derivative thermogravimetric (DTG) curves of unmodified graphene powder (EG) and the EG@$MnO_2$ composite prepared in Example 1.

Two major differences are observed in the TGA curves of the two materials shown in FIG. 6. First, pure graphene remains stable (no mass loss) until about 530° C. and then reached maxima at ca. 645° C. and 725° C. as seen in FIG. 7, EG. This temperature (530° C.) is the onset of the removal of stable oxygen functional groups and for the burn-off/thermal degradation of the carbon skeleton.

In contrast, for EG@$MnO_2$, a first weight loss of 15% was recorded between 300° C. and 410° C. with a peak at 372° C., as seen in FIG. 7, EG@$MnO_2$. This is ascribed to the removal of the labile oxygen functional groups present in this EG due to the oxidation state of graphene sheets during $MnO_2$ deposition process—see Zhang et al., J. Mater. Chem. 22, 22150-22154 (2012), incorporated herein by reference. A second stage occurred from 410 to 640° C. with a maximum at ca. 545° C. (FIG. 7, EG@$MnO_2$), and it includes the removal of stable oxygen functional groups, the combustion of the carbon skeleton of EG and also the release of oxygen in the transformation of $MnO_2$ into $Mn_2O_3$—

Zhong et al., ChemElectroChem. 4, 1088-1094 (2017), incorporated herein by reference. And then, EG@MnO$_2$ composites were heated to 900° C. in an air atmosphere to determine the content of manganese oxide, as shown in FIG. 6, EG@MnO$_2$. The early weight loss observed for the hybrid material suggests that the incorporation of MnO$_2$ in the preparation of the nanocomposite decreased its thermal stability.

Characterization by X-Ray Diffraction (XRD) Analysis

The crystalline phases of the pure graphene and functionalized graphene-manganese dioxide (EG@MnO$_2$) powders were determined by X-ray diffraction (XRD) using a Bruker® D8 Advance® X-ray diffractometer θ/2θ with Cu-Kα radiation (λ=1.542 Å). The data were collected between 5° and 90° by using 0.02° increments and an integration time of 1.3 s per increment with a scintillator detector.

The XRD pattern of EG (FIG. 8, bottom) displays a broad diffraction peak centered 2θ=10.26°, an intense peak at 26.2° and a weaker peak at 43.4° corresponding to the (001), (002) and (100) planes of graphene material as described in e.g. Fu et al., Int. J. Electrochem. Sci. 8, 6269-6280 (2013) and in Carneiro et al., J. Catal. 332, 51-61 (2015), both of which are incorporated herein by reference. For EG, the appearance of the broad (001) peak in the XRD pattern gives the evidence that the material is partially oxidized—see Moon et al., Nat. Commun. 1, 73-79 (2010), incorporated herein by reference.

The intensity of the strong peak at 2θ=26.2° decreased for the composite material (FIG. 8, top), indicating that the incorporation of MnO$_2$ in the EG@MnO$_2$ composite material resulted in the disordered stacking of graphene sheets—see Yang et al., ACS Appl. Mater. Interfaces. 3, 2779-2785 (2011), incorporated herein by reference. On the other hand, the intensity of the broad peak observed at 2θ=10.6° increased, related to an oxygen function contribution, indirectly confirming the presence of manganese dioxide which causes the disorder in graphene network. The presence of MnO$_2$ is confirmed after a carefully analysis of the XRD pattern. The chemical compound is most likely ε-MnO$_2$ (PDF #12-0141) and has low crystallinity, which is in accordance with some previous works e.g. in Gambou-Bosca et al., J. Electrochem. Soc. 162 (2015) A5115-A5123, incorporated herein by reference.

Characterization by Raman Spectroscopy

Raman spectra (Raman, Renishaw®, inVia®) were collected in confocal mode using the radiation with wave length of 532 nm.

In FIG. 9 (bottom), the Raman spectrum of the EG material displays the three typical peaks of graphene centered around 1350, 1579 and 2708 cm$^{-1}$ which correspond to D, G and 2D bands, respectively (ACS Nano. 9, 5520-5535 (2015)).

The composite material (EG@MnO$_2$), FIG. 9 (top), also shows the characteristic D, G and 2D bands of reduced graphene oxide at ca. 1353, 1582 and 2711 cm$^{-1}$, respectively, with a new peak at 655 cm$^{-1}$ (see Ejigu et al., Adv. Funct. Mater. 28, 1804357 (2018), incorporated herein by reference) assigned to the Mn—O vibrations perpendicular to the direction of the MnO$_6$ octahedral double chains of MnO$_2$ (see Gao et al., J. Phys. Chem. 112, 13134-13140 (2008), incorporated herein by reference). This confirms once again the successful functionalization of the graphene sheets with MnO$_2$. The slight blue shift of the Raman bands is due to the surface oxidation of graphene during the preparation of EG@MnO$_2$. The I$_D$/I$_G$ ratio, which is indicative of the defect level in the reduced graphene oxide is about 0.5.

Characterization by X-Ray Photoelectron Spectroscopy (XPS) Analysis

X-ray photoelectron spectroscopy (XPS) studies were performed on a VG Escalab® 220i-XL using a polychromatic Al source (hv=1486.6 eV) operating at 15 kV and 20 mA. The signal was filtered with a hemispherical analyser (pass energy=20 eV) and the detection was performed with a multi-channel detector. The base pressure inside the spectrometer during analysis was 3×10$^{-10}$ Torr.

XPS analysis was performed to quantify the surface chemical composition of EG and EG@MnO$_2$. In addition to the peaks of carbon (C 1s) and oxygen (O 1s), the survey spectrum in FIG. 10 clearly shows the peak associated to Mn 2p consistent with the presence of MnO$_2$ on the composite material.

FIG. 11 shows the high-resolution Mn 2p spectrum of the MnO$_2$ in the composite material (EG@MnO$_2$). This signal could be split in two components with the Mn 2p$_{3/2}$ peak centered at 642 eV and Mn 2p$_{1/2}$ peak located at 653.7 eV, with a spin-energy separation of 11.7 eV, indicating that the oxidation state of the Mn ion is +4 in the hybrid EG@MnO$_2$ material—see Yang et al., Mater. Res. Innov. 20, 92-98 (2016), incorporated herein by reference).

FIG. 12 shows the high-resolution C 1s spectrum of the MnO$_2$ in the composite material (EG@MnO$_2$). This spectrum shows that graphene oxide was obtained. Indeed, we compared this XPS spectrum with that reported in the literature for graphene oxide (GO)—see Muralikrishna et al., In Anal. Methods, 2014, 6, 8698-8705 and Chen et al., Carbon, 64, 2013, 225-229, both of which are incorporated herein by reference. In our case, the area under the peaks corresponding to C—C, C═C and COOH, which are indicated in FIG. 12 for clarity, is much smaller then the peak area attributed to C—C/C═C. In contrast, the C(1s) literature spectra for GO show a comparable or even higher peak areas of oxidized carbon compared to C—C/C═C.

Characterization by EDS

Energy-dispersive X-ray spectroscopy (EDS) was used to study the elements contained in the EG@MnO$_2$ composite. A scanning electron microscope Tescan LYRA 3 XMH equipped with an energy dispersive X-ray (EDX) detector QUANTAX Compact (X-Flash 6160) was used.

Figure 13:
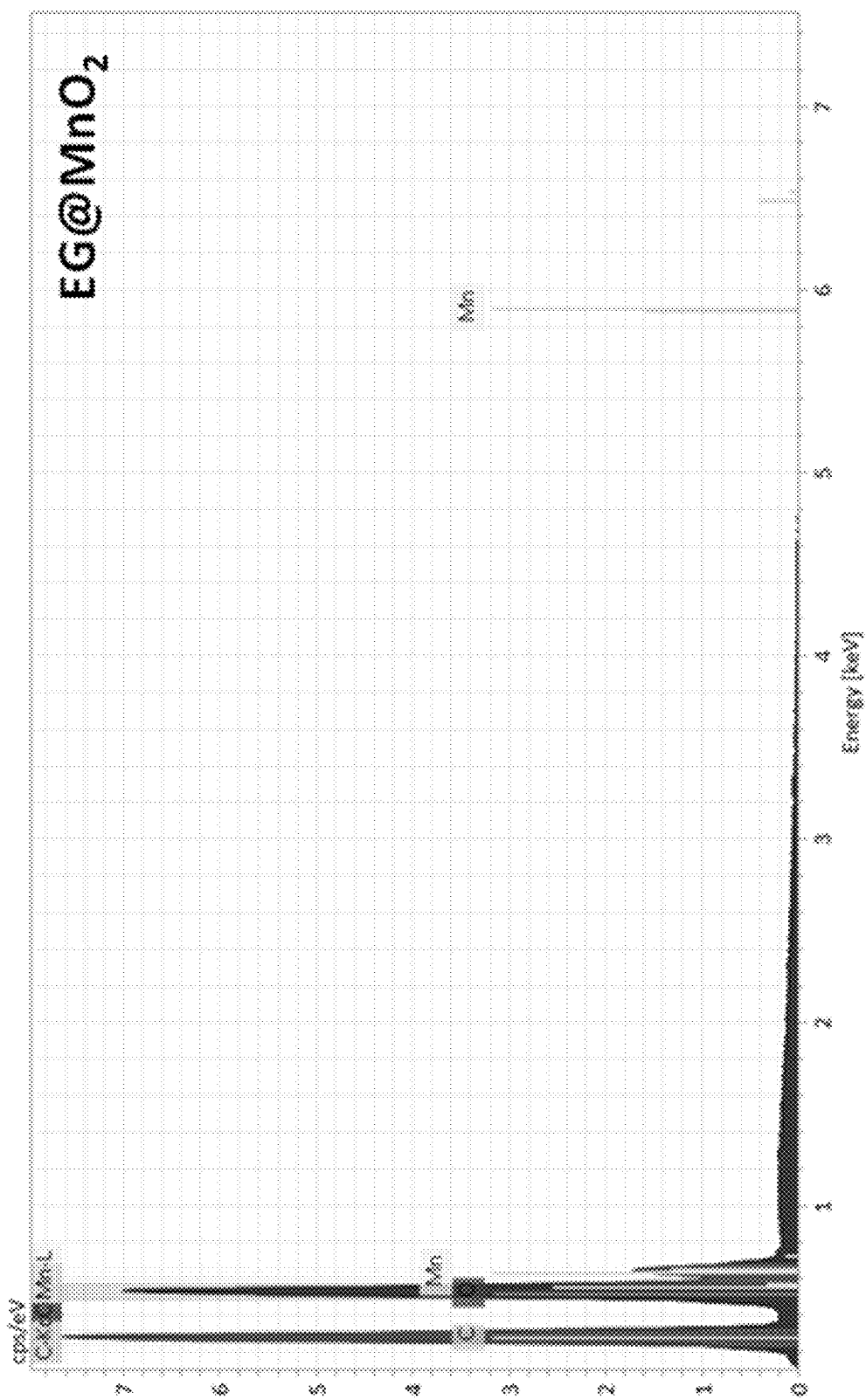
FIG. 13 shows the EDS spectrum of the EG@$MnO_2$ composite prepared in Example 1.

The EDS spectrum, shown in FIG. 13, shows only C, O and Mn signals for EG@MnO$_2$. No other elements were found in the composite.

Characterization by TEM

Transmission electron microscopy (TEM) was used to further characterize the morphology of the composite. A transmission electron microscope JEOL JEM-2100F model with a 200 keV operated with a bright field was used.

Figure 14:
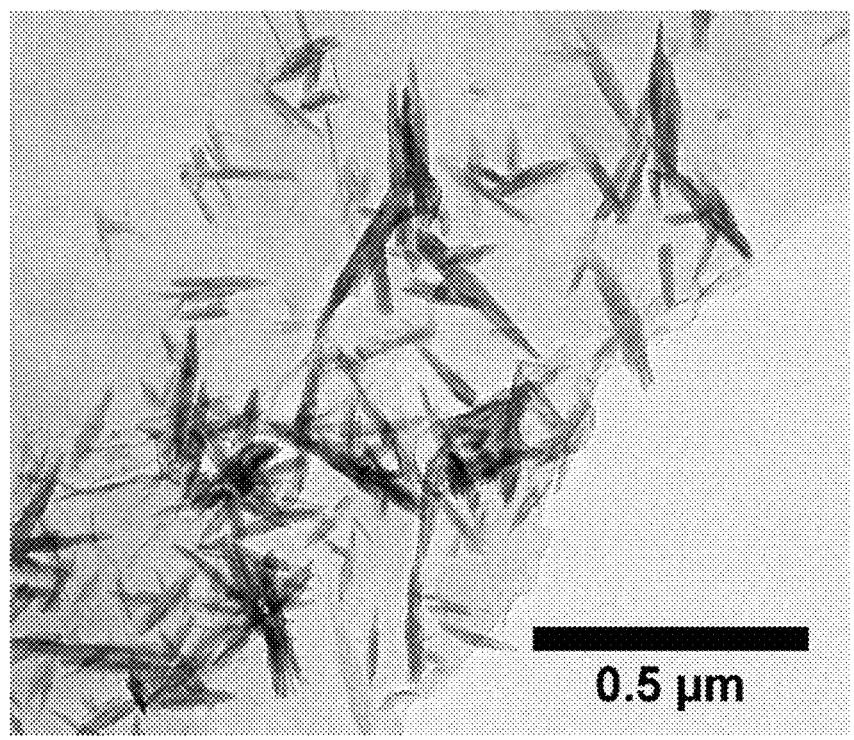
FIG. 14 is a TEM image of the EG@$MnO_2$ composite prepared in Example 1.
Figure 15:
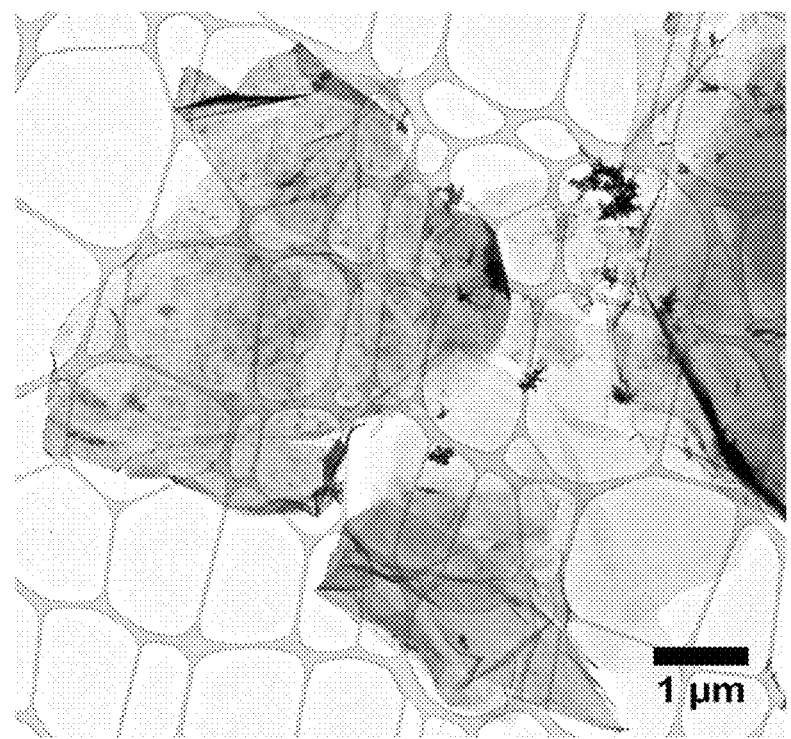
FIG. 15 is a TEM image of the EG@$MnO_2$ composite prepared in Example 1 at higher magnification.
Figure 16:
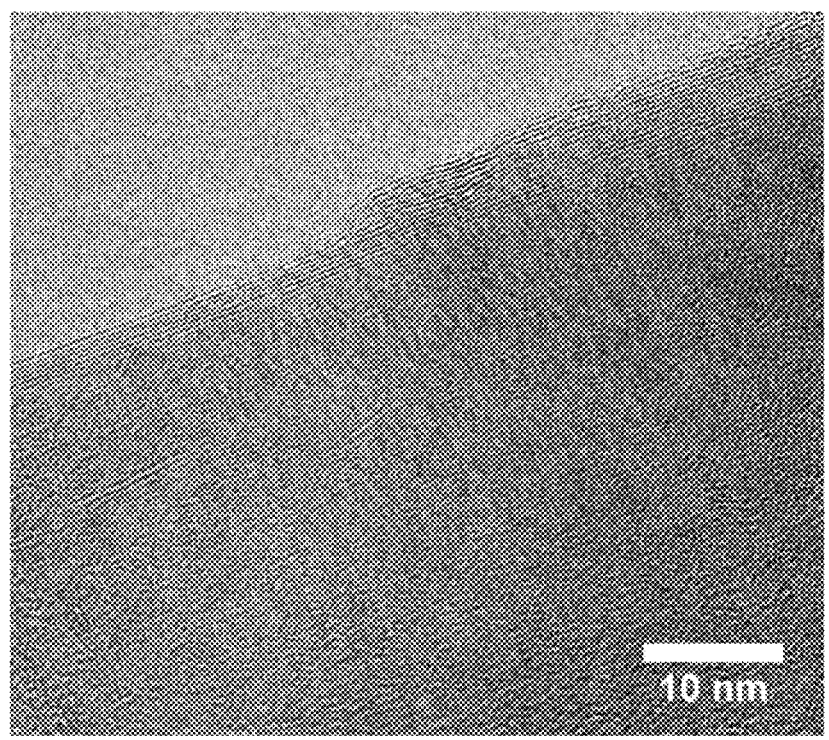
FIG. 16 is a high-resolution TEM image of the EG@$MnO_2$ composite prepared in Example 1.

FIGS. 14, 15, and 16 show the composite at increase magnifications. In FIG. 14, the rod-like MnO$_2$ particles dispersed on the reduced graphene oxide sheet are clearly observed. FIG. 15 is a low magnification image of the reduced graphene oxide sheets. It shows that they are up to 10 μm in lateral size. FIG. 16 is a high-resolution TEM image showing the reduced graphene oxide sheet is composed of 5 layers.

Example 2—Electrochemical Performances of Electrodes

The electrochemical behavior of the pure (EG) and hybrid (EG@MnO$_2$) graphene materials as prepared in Example 1 was evaluated using a three-electrode cell set-up, which consisted of a working electrode, platinum mesh as the counter electrode and Ag/AgCl as the reference electrode. Two working electrodes were tested (reported herein in Examples 2a and 2b, respectively).

The performance of nanocomposite electrodes was evaluated by cyclic voltammetry (CV) measurements in aqueous 1M $Na_2SO_4$ electrolyte at room temperature using a Potentiostat/Galvanostat Model 273A, in the potential window range of −0.1 to 0.9 V.

Example 2a—Free-Standing Film Electrode

The first working electrode consisted of a free-standing film prepared by vacuum filtration of the composite material (EG@$MnO_2$) as prepared in Example 1 (or pure graphene (EG) as a control). The square film of approximately 0.25 $cm^2$ in size and 2.0 mg in weight was placed on a stainless-steel grid (80 mesh, 0.127 mm, from Alfa Aesar®) used as a current collector and pressed at 0.9 MPa.

Figure 17:
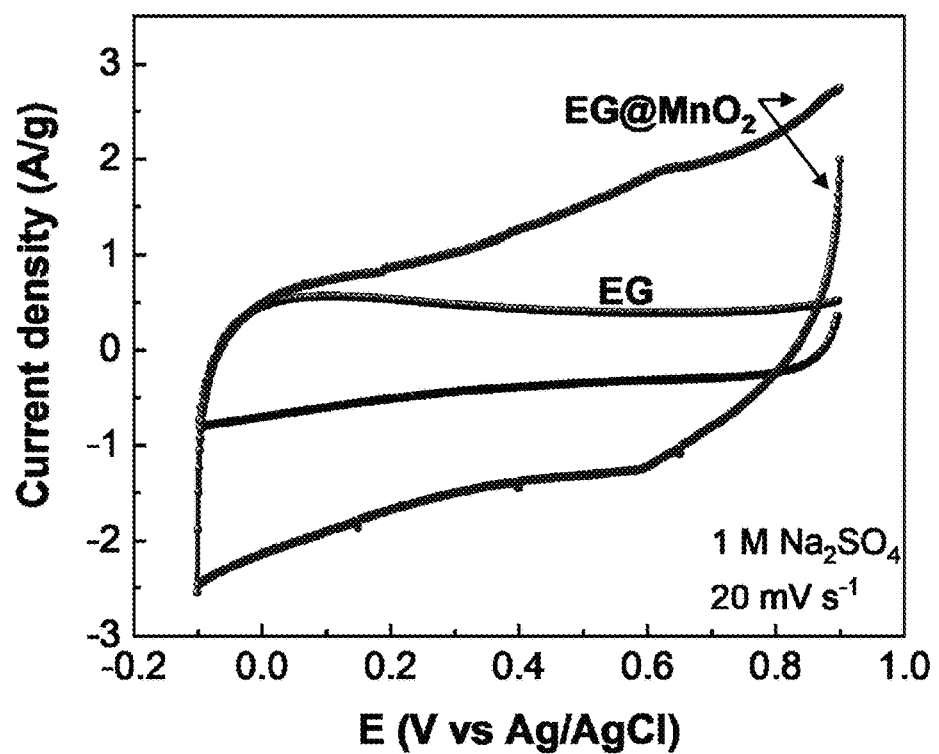
FIG. 17 shows the cyclic voltammograms (CV) (current density (A/g) versus potential (V vs. Ag/AgCl)) of unmodified graphene powder (EG) and EG@$MnO_2$ composite electrodes as prepared in Example 2a, recorded in 1 M $Na_2SO_4$ at a scan rate of 20 mV s$^{-1}$.

As seen from FIG. 17, the EG@$MnO_2$ hybrid electrode exhibited a near rectangular-shaped and symmetric CV curve at 20 mV $s^{-1}$, which is typical of an ideal capacitive behavior—see Li et al., J. Mater. Chem. 21, 14706-14711 (2011), incorporated herein by reference. Its excellent electrochemical performance was demonstrated by a larger gravimetric current density compared to the pure graphene electrode. This excellent capacitive performance of EG@$MnO_2$ can be attributed to the synergic effect between $MnO_2$ and EG, and to the excellent conductivity of graphene material.

The current density in the CVs increased gradually with the increased of the scan rate from 10 to 200 mV $s^{-1}$ as seen in FIG. 18. As shown, the CV curves of EG@$MnO_2$ nanocomposite electrode was close to rectangular at the applied scan rates including the high scan rate of 200 mV $s^{-1}$, indicating fast charge-discharge processes in 1 M $Na_2SO_4$ solution and a low contact resistance in the supercapacitor. This behavior suggests an excellent capacitive behavior of EG@$MnO_2$ nanocomposite.

Figure 19:
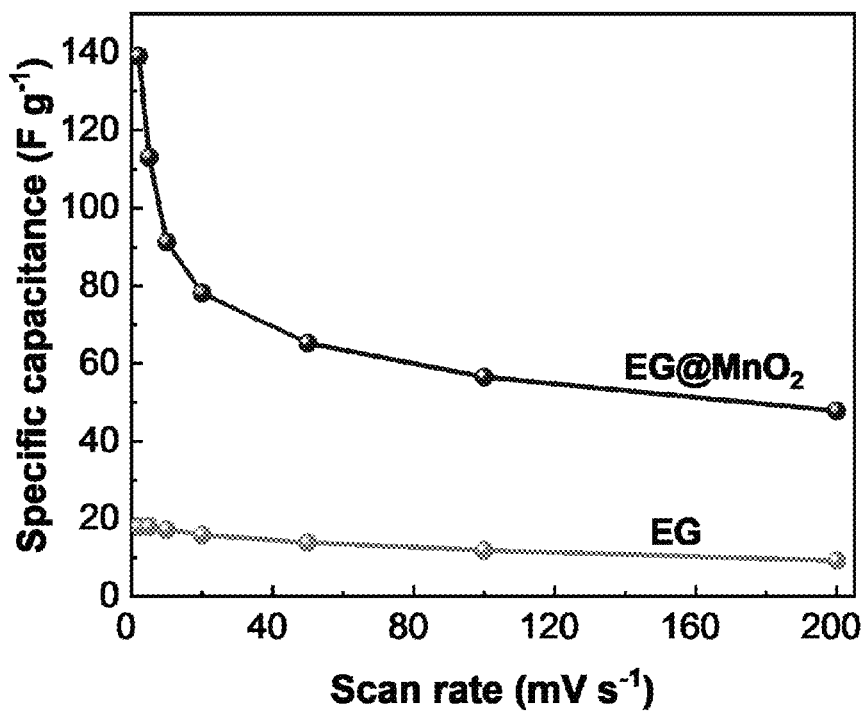
FIG. 19 shows the evolution of the specific capacitance of electrodes of unmodified graphene powder (EG) and EG@$MnO_2$ composite electrodes as prepared in Example 2a as a function of the scan rate.

The variation of the specific capacity with the scan rate of the graphene materials is shown in FIG. 19. As one can see, the capacitance decreased with increasing scan rate. This decrease of the capacitance was mainly caused by the relatively insufficient redox reaction of active materials under high scan rate. At a low scan rate of 2 mV $s^{-1}$, the $Na^+$ ions could easily diffuse into almost all available space of the hybrid material, leading to a sufficient insertion reaction. However, increasing the scan rate had a remarkable impact on the diffusion of $Na^+$ into the hybrid material (FIG. 19, EG@$MnO_2$). At a high scan rate of 200 mV $s^{-1}$, the $Na^+$ ion could only approach the outer surface of the hybrid material and the material located in the deep space has little contribution to the electrochemical capacitive behavior as observed e.g. Li et al., J. Power Sources. 196, 8160-8165 (2011) and Yu et al., Nano Lett. 11, 4438-4442 (2101), both of which are incorporated herein by reference. On the other hand, a monotonous decrease in observed with the pure graphene electrode, as seen in FIG. 19, EG. The hybrid material shows a noticeably higher specific capacity than non-functionalized graphene material.

Good cycling stability is of paramount importance for supercapacitors. FIG. 20 shows the cyclic electrochemical performance of EG@$MnO_2$ nanocomposite at scan rate of 20 mV $s^{-1}$ for 2000 cycles in 1 M $Na_2SO_4$. After 2000 cycles, the retention of the initial capacitance is 92%, which points out for the remarkable cycle stability of EG@$MnO_2$. The decrease of initial specific capacitance of the electrode in the initial 400 cycles may be ascribed to the lost of the active materials in electrode into the electrolyte solution.

Example 2b—Supported Electrode

In order to study the operating window of the composite material, a second working electrode was fabricated by mixing the composite material (EG@$MnO_2$) prepared in Example 1 and PTFE binder (Sigma Aldrich, 60 wt. % dispersion in $H_2O$) in a 95:5 wt % ratio in a small volume of ethanol until a homogenized paste-like consistency was obtained. The paste was cold rolled and a square of approximately 0.25 $cm^2$ in size and was pressed. Then, the electrochemical experiment was run in 0.65 M $Na_2SO_4$. For control purposes, another electrode was made in the same way, except that unmodified pure graphene (EG) was used instead of the composite material (EG@$MnO_2$).

As seen from FIG. 21, this EG@$MnO_2$ electrode displayed a broad voltage window of 2.0 V. Thus, EG@$MnO_2$ could be used as negative or positive electrode for symmetric or asymmetric electrochemical capacitors (ECs).

Figure 22:
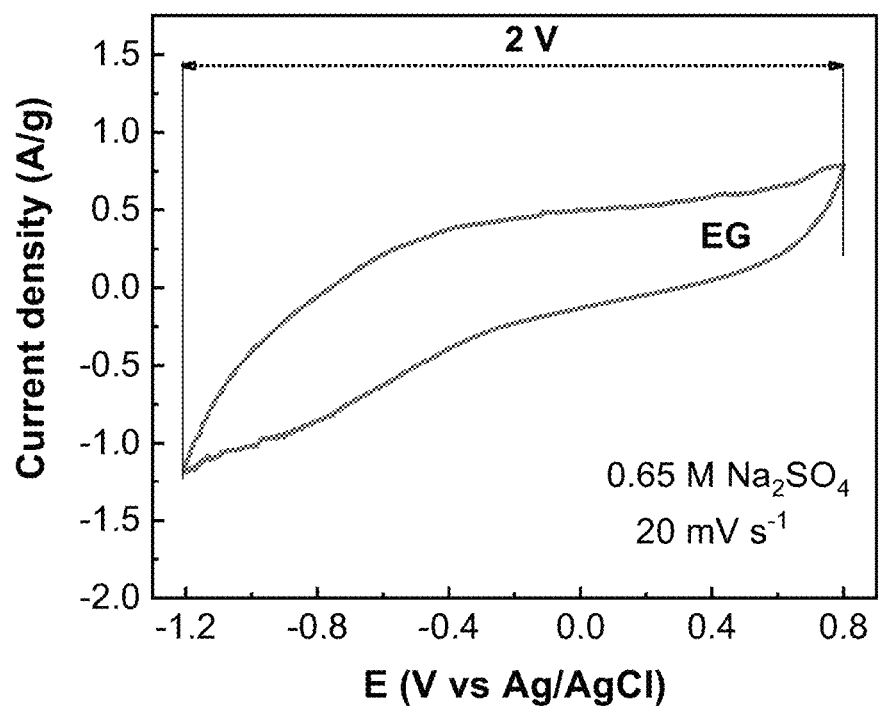
FIG. 22 shows the CV curve of the EG electrode prepared in Example 2b at 2V recorded in 0.65 M $Na_2SO_4$ at the scan rate of 20 mV s$^{-1}$.

As seen from FIG. 22, at more negative potentials, the graphene (EG) electrode is unstable compared to the EG@$MnO_2$ electrode. The electrode material degraded, and hydrogen evolution was observed. In addition, the charge density stored by the EG electrode was much smaller than the one stored by the EG@$MnO_2$ electrode.

For comparison purposes, Table 1 shows the working voltages reported in the literature for electrode of graphene/manganese oxide composite made by other methods.

TABLE 1

Electrochemical properties reported in recent papers for Graphene/$MnO_2$-based electrodes in various aqueous electrolytes with different working voltages.

| Material | Electrolyte | Working Voltage | References (all of which are incorporated herein by reference) |
|---|---|---|---|
| 3D-rGO/$MnO_2$ | 1.0M $Na_2SO_4$ | 0.8 V | Zhong et al., ChemElectroChem. 4, 1088-1094 (2017) |
| Graphene/$MnO_2$ | 0.1M $Na_2SO_4$ | 0.8 V | Li et al., J. Mater. Chem. 21, 14706-14711 (2011) |
| $MnO_2$-graphene | 3M KCl | 1.0 V | Lee et al., J. Mater. Chem. A, 2013, 1, 3395-3405 |
| GN/AC/$MnO_2$ | 1M $Na_2SO_4$ | 0.8 V | Xu et al., Scientific Reports, 2017, 7, 12857 |
| Graphene/$MnO_2$ foams | 1M $Na_2NO_3$ | 1.0 V | Drieschner et al., Nanotechnology, 2018, 29, 225402 |
| Graphene/$MnO_2$ | 0.5M $Na_2SO_4$ | 0.9 V | Yu et al., Nano Lett., 11, 4438-4442 (2011) |

Example 3—Graphene/$MnO_2$ Composite (EG@$MnO_2$) Produced Using Alternative Electrochemical Exfoliation Conditions To show the robustness of the method used in Example 1, graphene/$MnO_2$ composites (EG@$MnO_2$) were produced using different exfoliation conditions.

Figure 23:
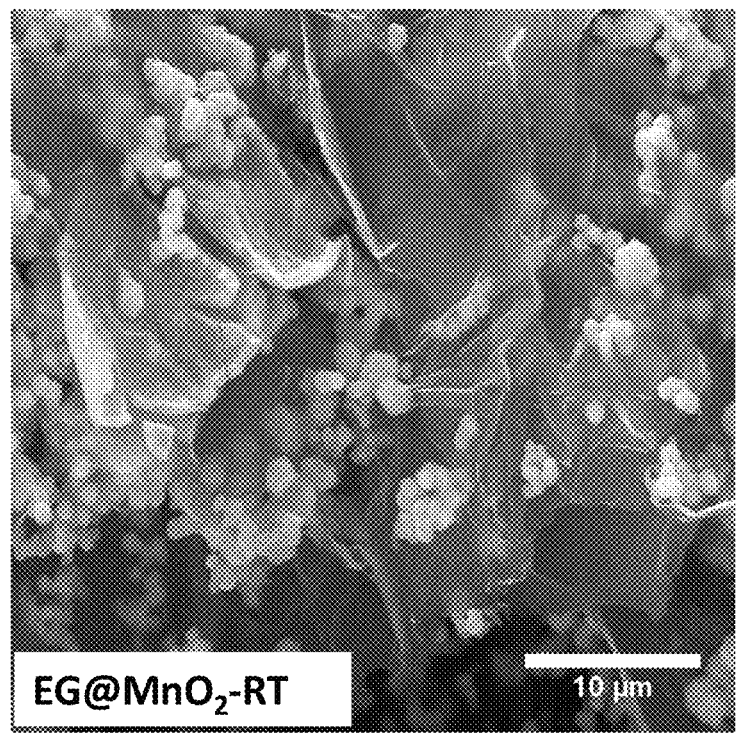
FIG. 23 is a SEM image of a graphene sheets decorated with manganese dioxide prepared at room temperature in Example 3 (EG@$MnO_2$—RT).

First, a composite was produced as in Example 1 except that the reaction medium was maintained at room temperature (rather than ca. 50° C.) during the exfoliation. FIG. 23 shows a SEM image of the obtained composite (EG@$MnO_2$-RT). This image can be compared to that shown in the FIG. 2 for the (EG@$MnO_2$) of Example 1. The composite prepared at room temperature was similar to that of Example 1.

Figure 24:
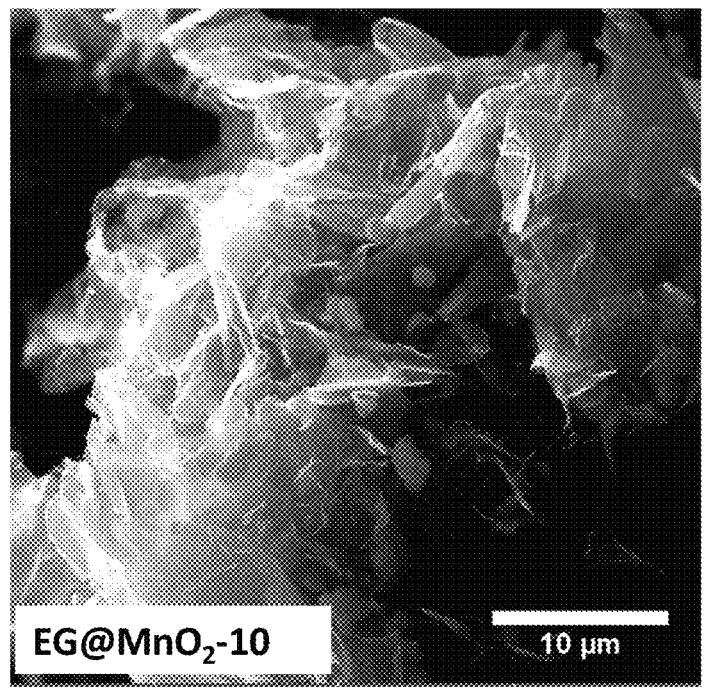
FIG. 24 is a SEM image of a graphene sheets decorated with manganese dioxide prepared in Example 3 with a salt concentration of 10 mM (EG@$MnO_2$-10).
Figure 25:
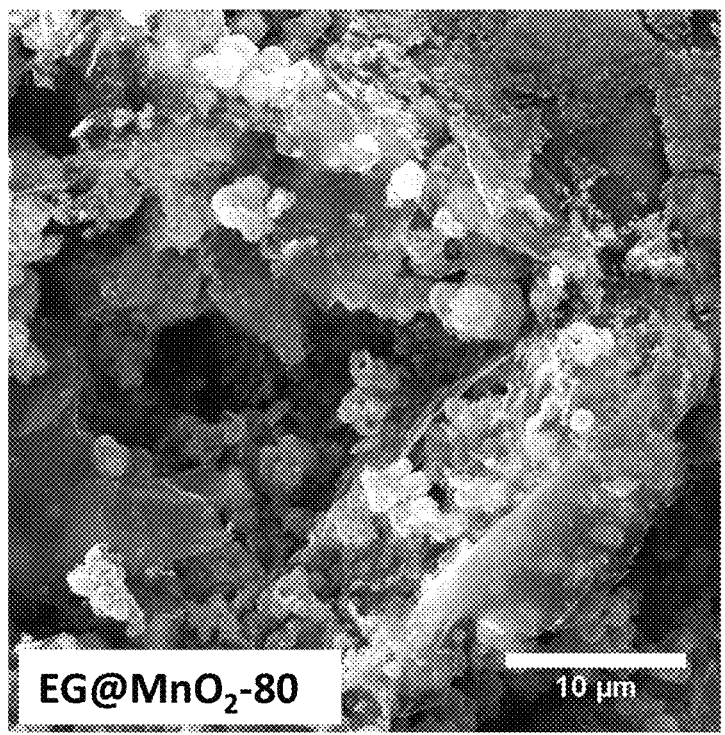
FIG. 25 is a SEM image of a graphene sheets decorated with manganese dioxide prepared in Example 3 with a salt concentration of 80 mM (EG@$MnO_2$-80).

Further, composites were produced as in Example 1 except that different salt concentrations (10 mM and 80 mM) in the electrolyte were used. FIG. 24 and FIG. 25 show SEM images of the obtained composites (EG@$MnO_2$-10 and EG@$MnO_2$-80, respectively). As we can see in the SEM images, the number of oxide particles deposited on the graphene sheets increased with the salt concentration.

Example 4—Preparation and Characterization of Graphene/Iron Oxide Composite

To prepare the graphene/iron oxide composite, a graphite foil was electrochemically exfoliated in a $Fe_2(SO_4)_3$/$H_2SO_4$ solution. Specifically, an aqueous electrolyte was prepared by adding the salt (20 mM $Fe_2(SO_4)_3$) into a 0.1 M $H_2SO_4$ solution. In one case, the reaction medium was maintained at ca. 50° C. during the synthesis to form the "Graphene/Iron oxide" composite, while in a second case, the reaction medium is maintained at room temperature to prepare the "Graphene/Iron oxide-RT" composite.

The obtained composites were characterized by XRD, SEM and EDS according the method reported in Example 1.

Figure 26:
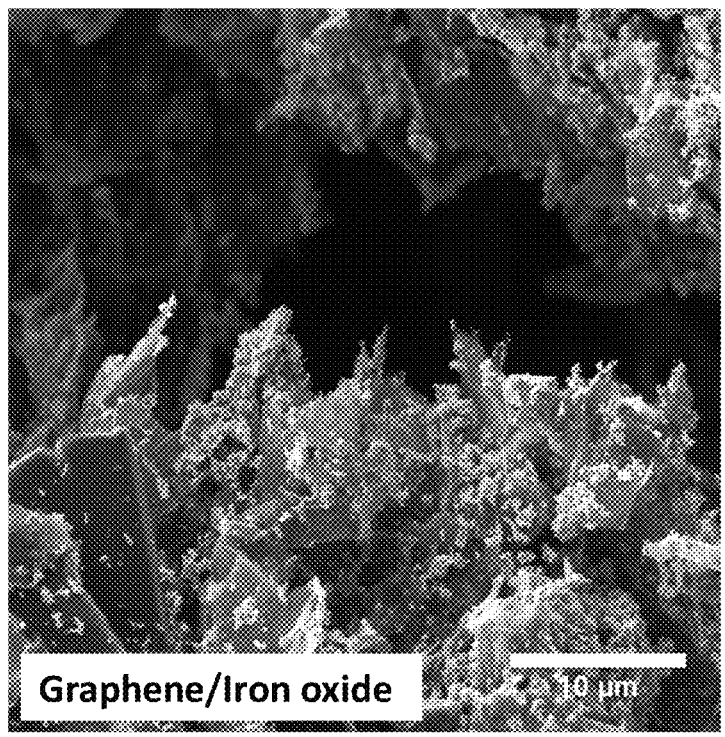
FIG. 26 is a SEM image of a graphene sheets decorated with iron oxide prepared at 50° C. in Example 4 (Graphene/Iron oxide).
Figure 27:
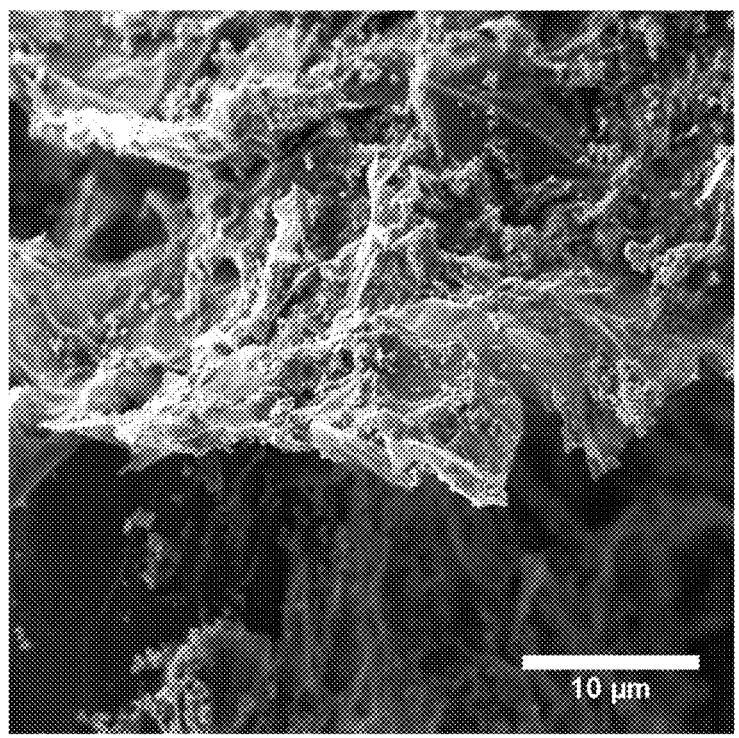
FIG. 27 is a SEM image of a graphene sheets decorated with iron oxide prepared at room temperature in Example 4 (Graphene/Iron oxide-RT).

The SEM image of the "Graphene/Iron oxide" composite is shown in FIG. 26. The SEM image of the "Graphene/Iron oxide-RT" composite is shown in FIG. 27. Both SEM images show the deposition of iron oxide nanoparticles on graphene sheets.

Figure 28:
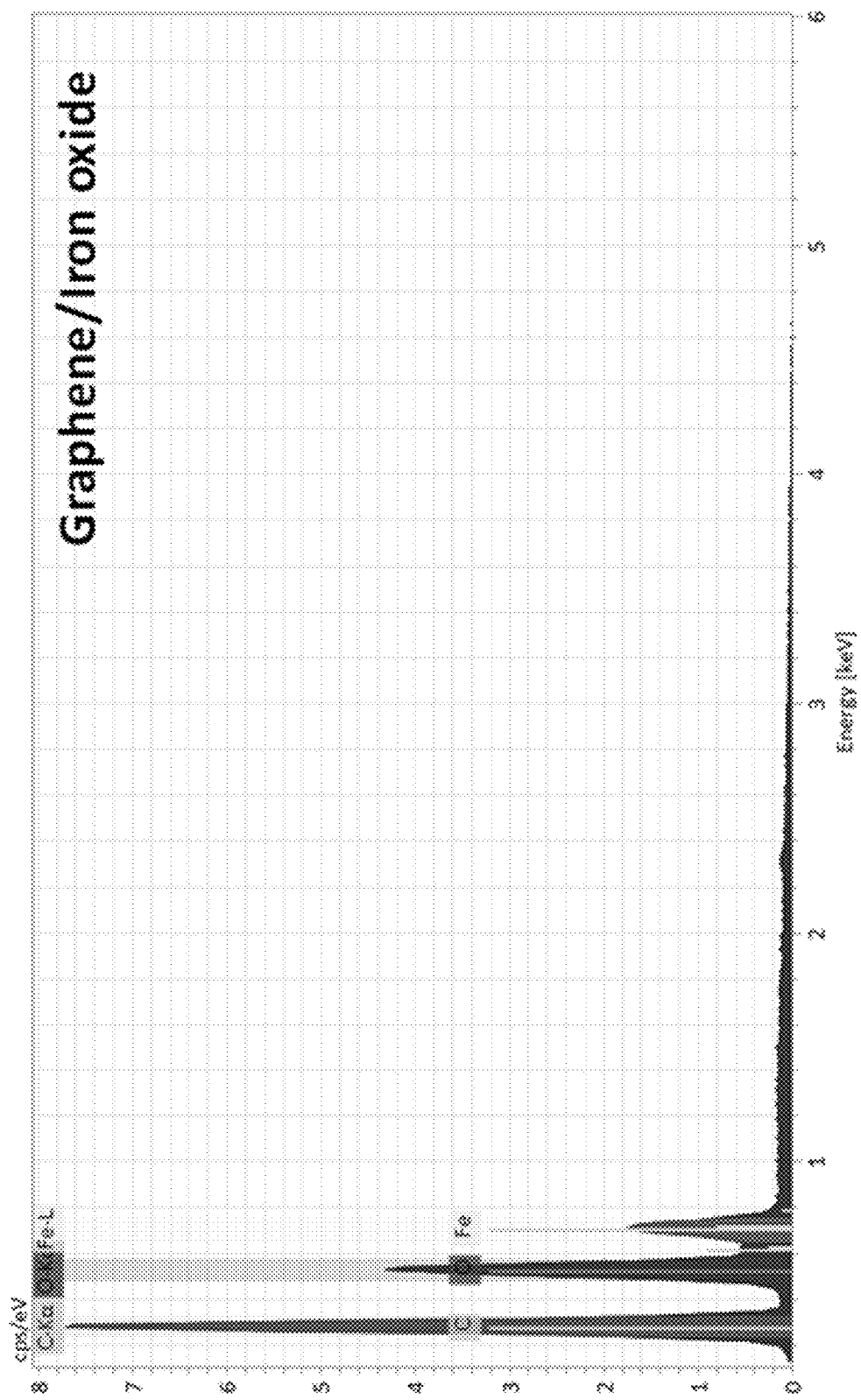
FIG. 28 shows the EDS spectrum of the Graphene/Iron oxide composite prepared in Example 4.

EDS spectrum of the "Graphene/Iron oxide" composite, shown in FIG. 28, exhibits only C, O and Fe peaks. No other element was found in the composite.

Figure 29:
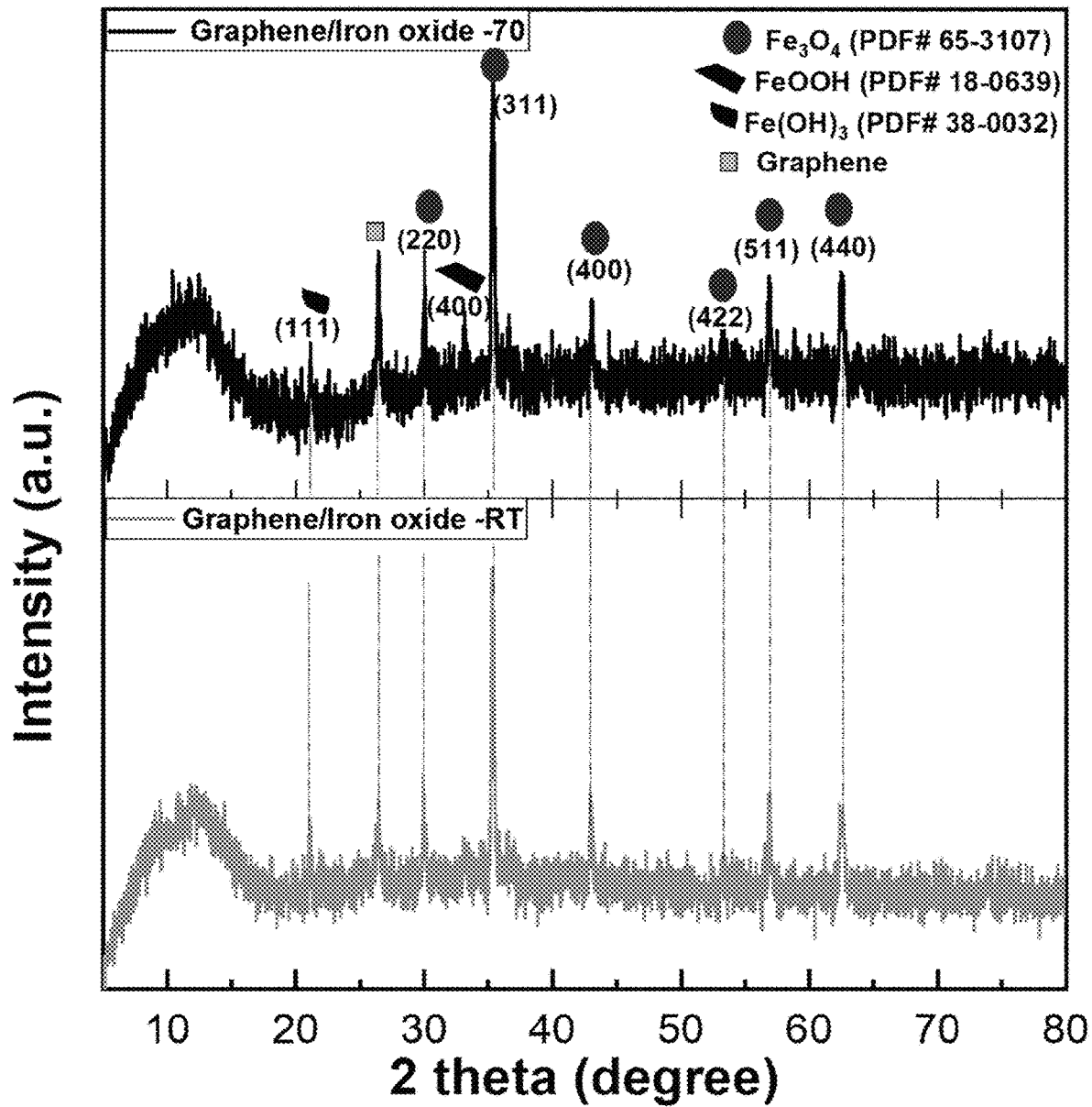
FIG. 29 shows the x-ray diffraction (XRD) patterns of the Graphene/Iron oxide composites prepared in Example 4 at 70° C. (top pattern) and at room temperature (bottom pattern).

The XRD pattern of the "Graphene/Iron oxide" composite, shown in FIG. 29, exhibits diffraction peaks at (220), (311), (400), (422), (511) and (440). This is characteristic of iron oxide ($Fe_3O_4$) as a main phase with traces of iron oxide hydroxide and iron hydroxide.

The scope of the claims should not be limited by the preferred embodiments set forth in the examples, but should be given the broadest interpretation consistent with the description as a whole.

REFERENCES

The present description refers to a number of documents, the content of which is herein incorporated by reference in their entirety. These documents include, but are not limited to, the following:
American patent application publication No. US 2013/0001089 A1.
American patent application publication No. US 2013/0102084 A1.
American patent application publication No. US 2014/0166475 A1.
American patent application publication No. US 2015/0166348 A1.
American patent no. U.S. Pat. No. 9,070,942 B2.
Chinese patent application publication No. CN 107293710 A.
Chinese patent application publication No. CN 108905910 A.
European patent application publication No. EP 2 864 238 A1.
European patent application publication No. EP 3 403 994 A1.
International patent application publication No. WO 2011/141486 A1.
International patent application publication No. WO 2012/062110 A1.
International patent application publication No. WO 2013/132261 A1.
International patent application publication No. WO 2017/060434 A1.
AbdelHamid et al., Generalized Synthesis of Metal Oxide Nanosheets and Their Application as Li-Ion Battery Anodes, Adv. Mater. 29, 1701427 (2017).
Abdelkader et al., How to get between the sheets: a review of recent works on the electrochemical exfoliation of graphene materials from bulk graphite, Nanoscale, 2015, 7, 6944.
Achee et al. High-yield scalable graphene nanosheet production from compressed graphite using electrochemical exfoliation, Scientific Reports (2018) 8:14525
Ambrosi et al., Electrochemically Exfoliated Graphene and Graphene Oxide for Energy Storage and Electrochemistry applications, Chem. Eur. J. 2016, 22, 153-159.
Bakandritsos et al., Covalently functionalized graphene as a supercapacitor electrode material, FlatChem. 13, 25-33 (2019).
Carneiro et al., $Nb_2O_5$ nanoparticles supported on reduced graphene oxide sheets as electrocatalyst for the $H_2O_2$ electrogeneration, J. Catal. 332 51-61 (2015).
Chen et al., An improved Hummers method for eco-friendly synthesis of graphene oxide, Carbon, 64, 2013, 225-229.
Drieschner et al., Uniformly coated highly porous graphene/$MnO_2$ foams for flexible asymmetric supercapacitors, Nanotechnology, 2018, 29, 225402.
Ejigu et al., Electrochemically Exfoliated Graphene Electrode for High-Performance Rechargeable Chloroaluminate and Dual-Ion Batteries, ACS Appl. Mater. Interfaces 2019, 11, 23261-23270.
Ejigu et al., On the Role of Transition Metal Salts During Electrochemical Exfoliation of Graphite: Antioxidants or Metal Oxide Decorators for Energy Storage Applications, Adv. Funct. Mater. 28, 1804357 (2018).
Fu et al., Evaluation and Characterization of Reduced Graphene Oxide Nanosheets as Anode Materials for Lithium-Ion Batteries, Int. J. Electrochem. Sci. 8, 6269-6280 (2013).
Gambou-Bosca et al., Chemical Mapping and Electrochemical Performance of Manganese Dioxide/Activated Carbon Based Composite Electrode for Asymmetric Electrochemical Capacitor, J. Electrochem. Soc. 162, A5115-A5123 (2015).
Gao et al., Microstructures and Spectroscopic Properties of Cryptomelane-type Manganese Dioxide Nanofibers, J. Phys. Chem. 112, 13134-13140 (2008).
Greenwood et al., Covalent Modification of Graphene and Graphite Using Diazonium Chemistry: Tunable Grafting and, ACS Nano. 9, 5520-5535 (2015).
Junfei et al., One-Step In situ Synthesis of SnO2/Graphene Nanocomposites and Its Application As an Anode Material for Li-Ion Batteries, ACS Appl. Mater. Interfaces 4, 454-459 (2012).
Kwon et al., Mass-Produced Electrochemically Exfoliated Graphene for Ultrahigh Thermally Conductive Paper Using a Multimetal Electrode System, Adv. Mater. Interfaces 2019, 6, 9, 1900095.
Lee et al., Improved supercapacitor performance of $MnO_2$-graphene composites constructed using a supercritical fluid and wrapped with an ionic liquid, J. Mater. Chem. A, 2013, 1, 3395-3405.
Li et al., Flexible graphene/MnO2 composite papers for supercapacitor electrodes, J. Mater. Chem. 21, 14706-14711 (2011).

Li et al., Synthesis of hydrothermally reduced graphene/ MnO₂ composites and their electrochemical properties as supercapacitors, J. Power Sources. 196, 8160-8165 (2011).

Moon et al., Reduced graphene oxide by chemical graphitization, Nat. Commun. 1, 73-79 (2010).

Mujeeb et al., Graphene based metal and metal oxide nanocomposites: synthesis, properties and their applications, J. Mater. Chem. A, 3, 18753-18808 (2015).

Muralikrishna et al., In situ reduction and functionalization of graphene oxide with 1-cysteine for simultaneous electrochemical determination of cadmium(ii), lead(ii), copper(ii), and mercury(ii) ions, Anal. Methods, 2014, 6, 8698-8705.

Novoselov et al., Electric field effect in atomically thin carbon films, Science. 306, 666-669 (2004).

Ossonon et al., Functionalization of graphene sheets by the diazonium chemistry during electrochemical exfoliation of graphite, Carbon 111, 83-93 (2017).

Parvez et al., Electrochemically Exfoliated Graphene as Solution-Processable, Highly Conductive Electrodes for Organic Electronics, ACS Nano 2013, 7, 4, 3598-3606.

Parvez et al., Exfoliation of Graphite into Graphene in Aqueous Solutions of Inorganic Salts, J. Am. Chem. Soc. 2014, 136, 6083-6091.

Tripathi et al., Synthesis of High-Quality Graphene through Electrochemical Exfoliation of Graphite in Alkaline Electrolyte, arXiv: 1310.7371.

Salanne et al., Efficient storage mechanisms for building better supercapacitors, Nat. Energy. 1, 16070-16080 (2016).

Sutter et al., Epitaxial Graphene on Ruthenium. Nat. Mater. 7, 406-411 (2008).

Xu et al., High-performance MnO₂-deposited graphene/ activated carbon film electrodes for flexible solid-state supercapacitor, Scientific Reports, 2017, 7, article number: 12857

Yang et al., Facile Fabrication of Functionalized Graphene Sheets (FGS)/ZnO Nanocomposites with Photocatalytic Property, ACS Appl. Mater. Interfaces. 3, 2779-2785 (2011).

Yang et al., Graphene/MnO₂ composite prepared by a simple method for high performance supercapacitor, Mater. Res. Innov. 20, 92-98 (2016).

Yu et al., Enhancing the Supercapacitor Performance of Graphene/MnO₂ Nanostructured Electrodes by Conductive Wrapping, Nano Lett., 11, 4438-4442 (2011).

Zhang et al., One-step electrochemical preparation of graphene-based heterostructures for Li storage, J. Mater. Chem., 2012, 22, 8455-8461.

Zhang et al., From graphitic materials: synergistic effect of oxidation and intercalation processes in open, semi-closed, and closed carbon, J. Mater. Chem., 22, 22150-22154 (2012).

Zhong et al., Preparation of 3D Reduced Graphene Oxide/ MnO₂ Nanocomposites through a Vacuum-Impregnation Method and Their Electrochemical Capacitive Behavior, ChemElectroChem. 4, 1088-1094 (2017).

Zhu et al., One-step electrochemical approach to the synthesis of Graphene/MnO₂ nanowall hybrids, Nano Res. 4, 648-657 (2011).

The invention claimed is:

1. A reduced graphene oxide/manganese(IV) oxide nanocomposite comprising reduced graphene oxide flakes and manganese oxide nanoparticles distributed on the surface of the flakes, wherein the manganese oxide nanoparticles are rod-shaped, and wherein the rod-shaped nanoparticles are about 100 nm to about 300 nm in average length and about 20 nm to about 50 nm in average width.

2. The nanocomposite of claim 1, wherein the reduced graphene oxide flakes range from about 1 μm to about 15 μm.

3. The nanocomposite of claim 1, wherein the reduced graphene oxide flakes may comprise between 1 and 9 layers.

4. The nanocomposite of claim 1, wherein the rod-shaped nanoparticles are about 150 nm to about 250 nm in average length.

5. The nanocomposite of claim 1, wherein a portion of the nanoparticles form aggregates.

6. The nanocomposite of claim 1, wherein a MnO₂ loading in the nanocomposite is about 30 wt % to about 50 wt %, based on the total weight of the nanocomposite.

7. The nanocomposite of claim 1, wherein the only elements present in the nanocomposite, as detected by an energy dispersive X-ray detector (EDX) on a SEM microscope and/or by energy-dispersive X-ray spectroscopy (EDS), are carbon, oxygen, and manganese.

8. The nanocomposite of claim 1, wherein the nanocomposite is characterized by an X-ray diffraction pattern comprising 2θ peaks at about 12.30°, about 24.06°, about 33.06°, and about 37.56°.

9. The nanocomposite of claim 1, wherein the nanocomposite is characterized by a Raman spectrum comprising peaks at about 1353 $cm^{-1}$, about 1582 $cm^{-1}$, about 2711 $cm^{-1}$, and about 655 $cm^{-1}$.

10. The nanocomposite of claim 1, wherein the nanocomposite is characterized by a Raman spectrum exhibits an intensity ratio of the D and G band ($I_D/I_G$) of about 0.5.

11. The nanocomposite of claim 1, wherein the nanocomposite is characterized by an X-ray photoelectron spectrum comprising the following peaks about 47.6 eV, about 74 eV, about 284.2 eV, about 232 eV, about 642 eV, about 653.7 eV, about 771.8 eV, and about 901.5 eV.

12. An electrode comprising a nanocomposite as defined in claim 1.

13. A method for producing a graphene material/metal compound nanocomposite comprising flakes of a graphene material and a metal compound distributed on the surface of the flakes, the method comprising the step of electrochemically exfoliating graphite in an exfoliation electrolyte comprising an intercalant and a precursor which is:
   an oxometallate;
   a polyoxometalate;
   a thiometallate;
   or a metal salt together with an acid, wherein the acid has a pKa value in water of −1.74 or less.

14. The method of claim 13, wherein the flakes of a graphene material are reduced graphene oxide flakes.

15. The method of claim 13, wherein the metal compound is a metal oxide, a metal hydroxide, a metal oxyhydroxide, or a metal sulfide.

16. The method of claim 13, wherein the metal in the metal compound is a metal from Groups 1 to 12 of the periodic table.

17. The method of claim 13, wherein the metal compound is nanoparticles of manganese oxide, iron oxide, or niobium sulfide.

18. The method of claim 13, wherein the electrochemical exfoliation comprises the steps of:
   providing an electrochemical cell comprising a working graphite electrode; a counter electrode; and an electrolyte comprising the intercalant and the precursor, and
   applying a potential difference between the working graphite electrode and the counter electrode, thereby exfoliating the working graphite electrode into the flakes of the graphene material and producing the metal compound distributed on the surface of the flakes.

19. The nanocomposite of claim 1, wherein the rod-shaped nanoparticles are about 30 nm to about 40 nm in average width.

20. The nanocomposite of claim 5, wherein the aggregates are up to 1 μm in size.

\* \* \* \* \*